US005435737A

United States Patent [19]
Haga et al.

[11] Patent Number: 5,435,737
[45] Date of Patent: Jul. 25, 1995

[54] REMOVABLE MEMORY MODULES

[75] Inventors: Donald Haga, Redwood City; Ronald Provenzale, Fremont; Richard Hibbs, Palo Alto, all of Calif.

[73] Assignee: Unisys Corporation, Blue Bell, Pa.

[21] Appl. No.: 173,852

[22] Filed: Oct. 12, 1993

Related U.S. Application Data

[63] Continuation of Ser. No. 930,921, Aug. 13, 1992, abandoned.

[51] Int. Cl.6 .............................................. H01R 13/62
[52] U.S. Cl. .................................................... 439/157
[58] Field of Search ................................ 439/152-160, 439/372, 59, 62, 65, 929.1, 928.1, 540

[56] References Cited

U.S. PATENT DOCUMENTS 3,767,974 10/1973 Donovan, Jr. et al. ............ 439/153
4,611,864 9/1986 Yokota .............................. 439/929.1

Primary Examiner—David L. Pirlot
Attorney, Agent, or Firm—John J. McCormack; Mark T. Starr

[57] ABSTRACT

A computer unit with identical compartments for receiving associated identical memory modules, these modules housing memory means adapted to be removably inserted into a receiving compartment which includes an electrical connector and engagement pin, each module also including an electrical connector for mating with the compartment connector; each module further including its own lever to engage this pin and so draw the module into the compartment, while mating the connectors, or to be reverse-activated to disengage the connectors and help eject the module from the compartment.

13 Claims, 21 Drawing Sheets

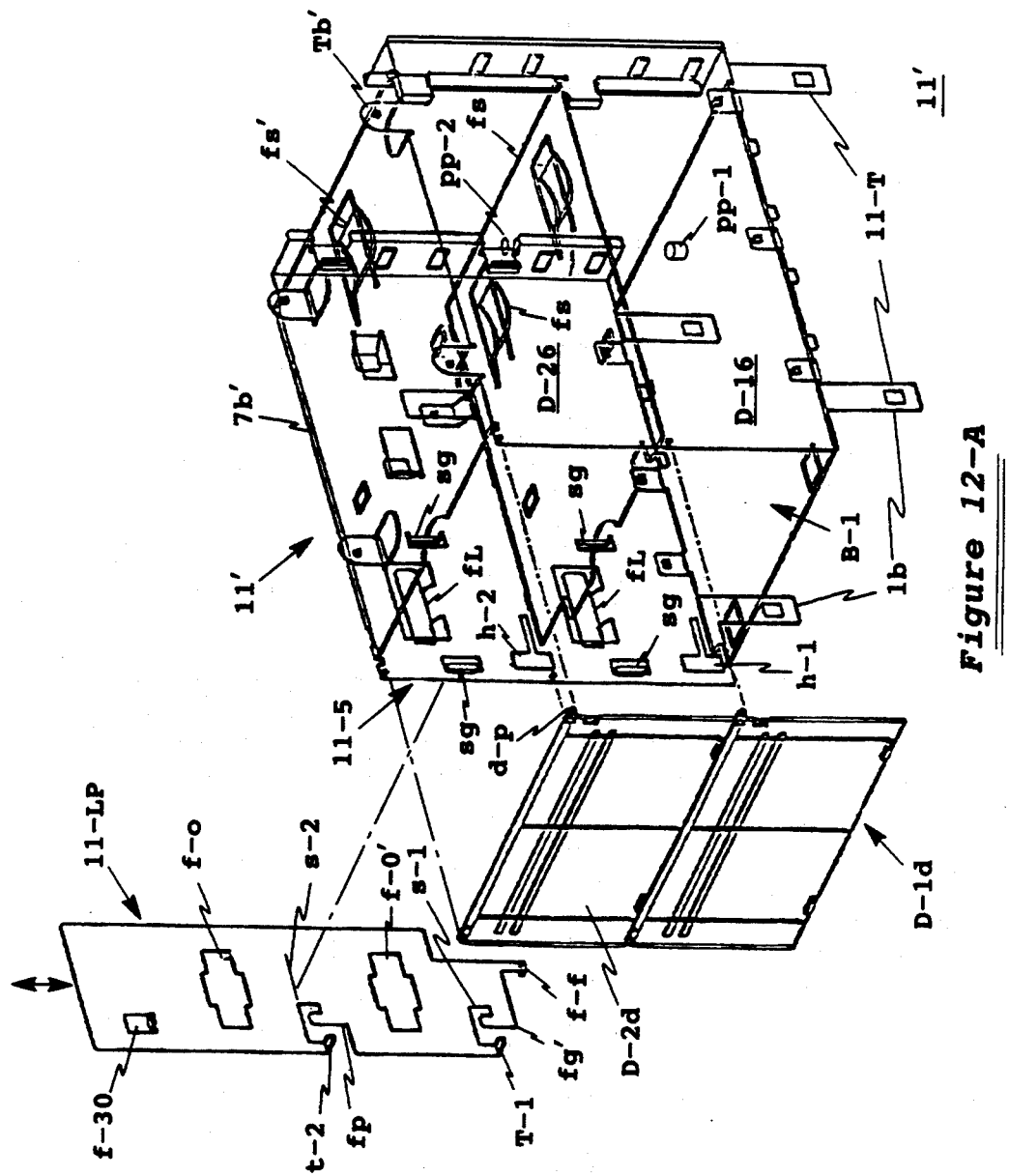

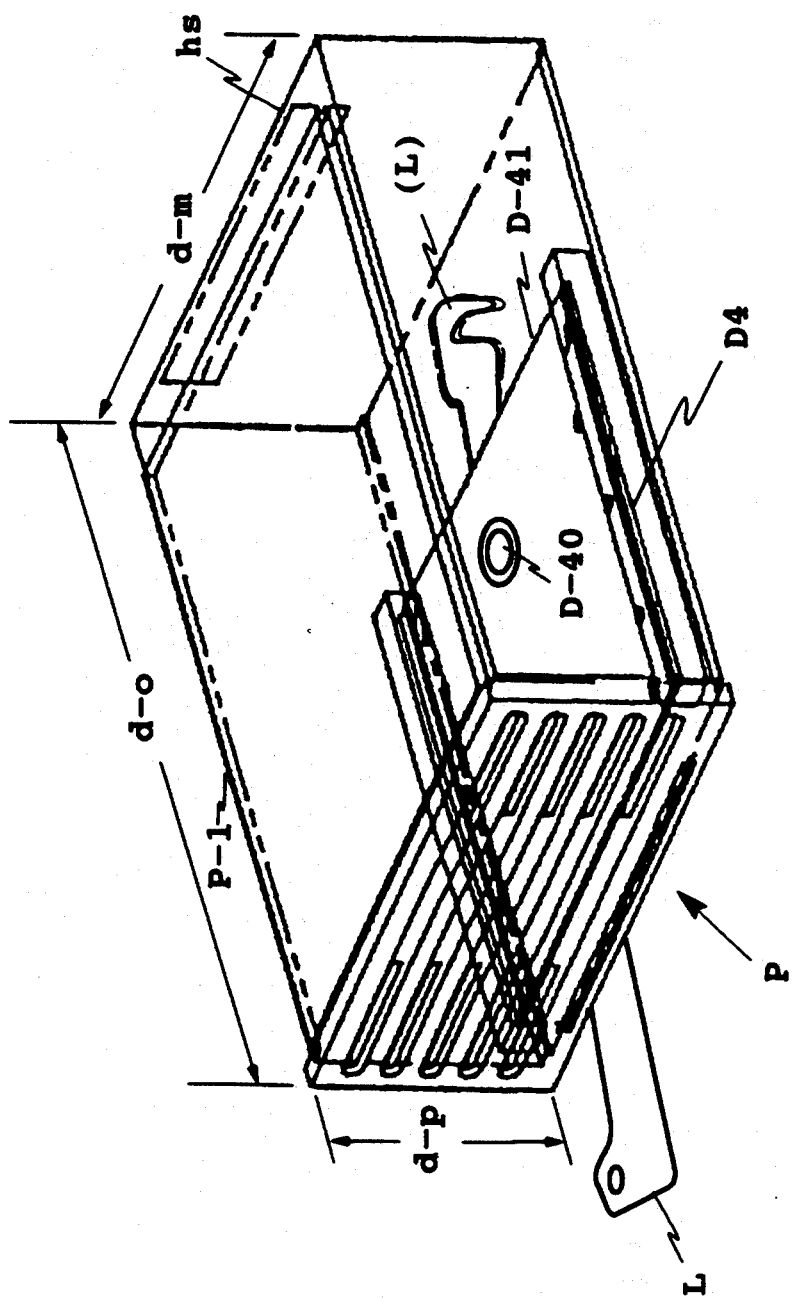
Figure 16-A

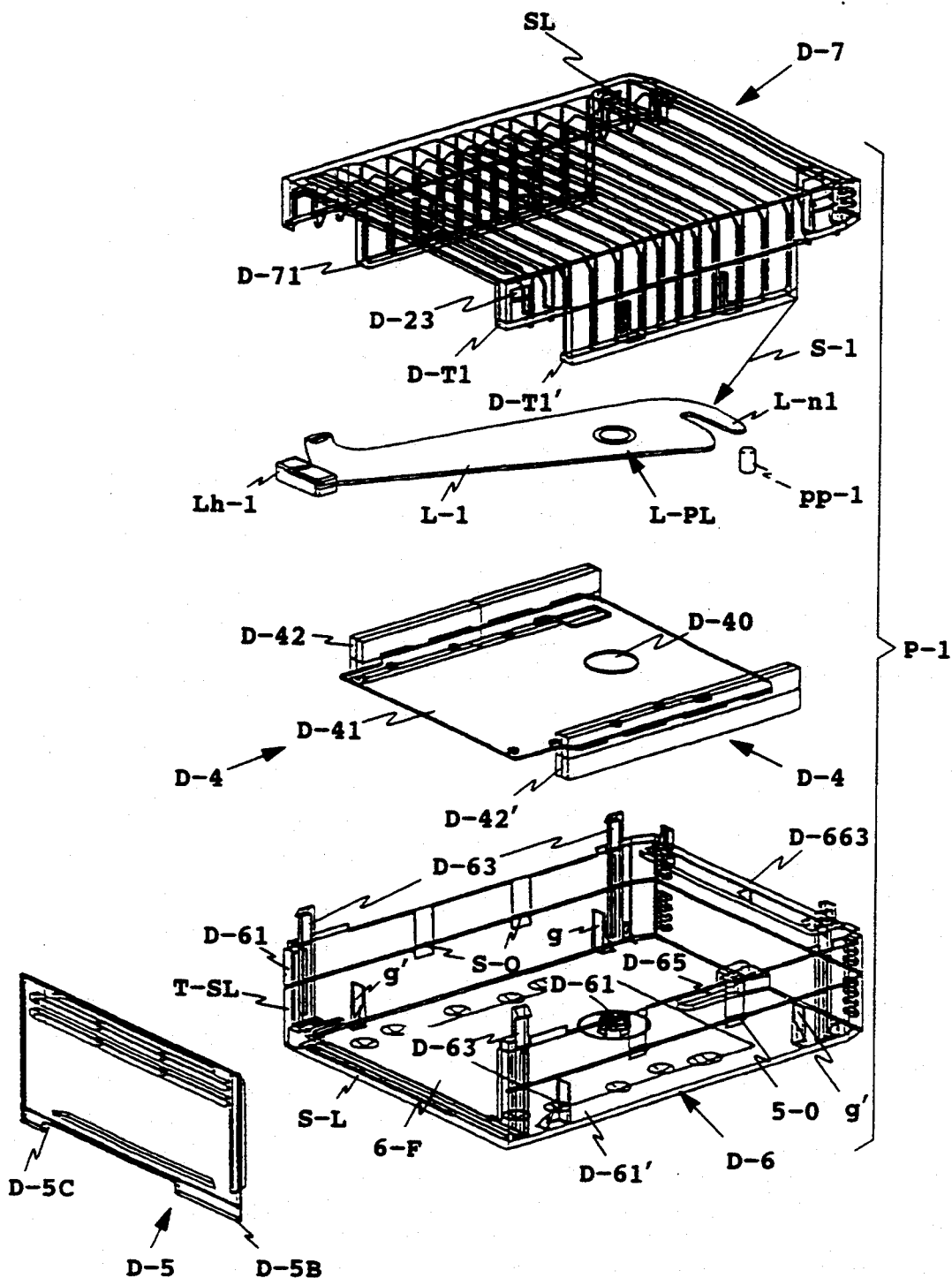
Figure 16-B

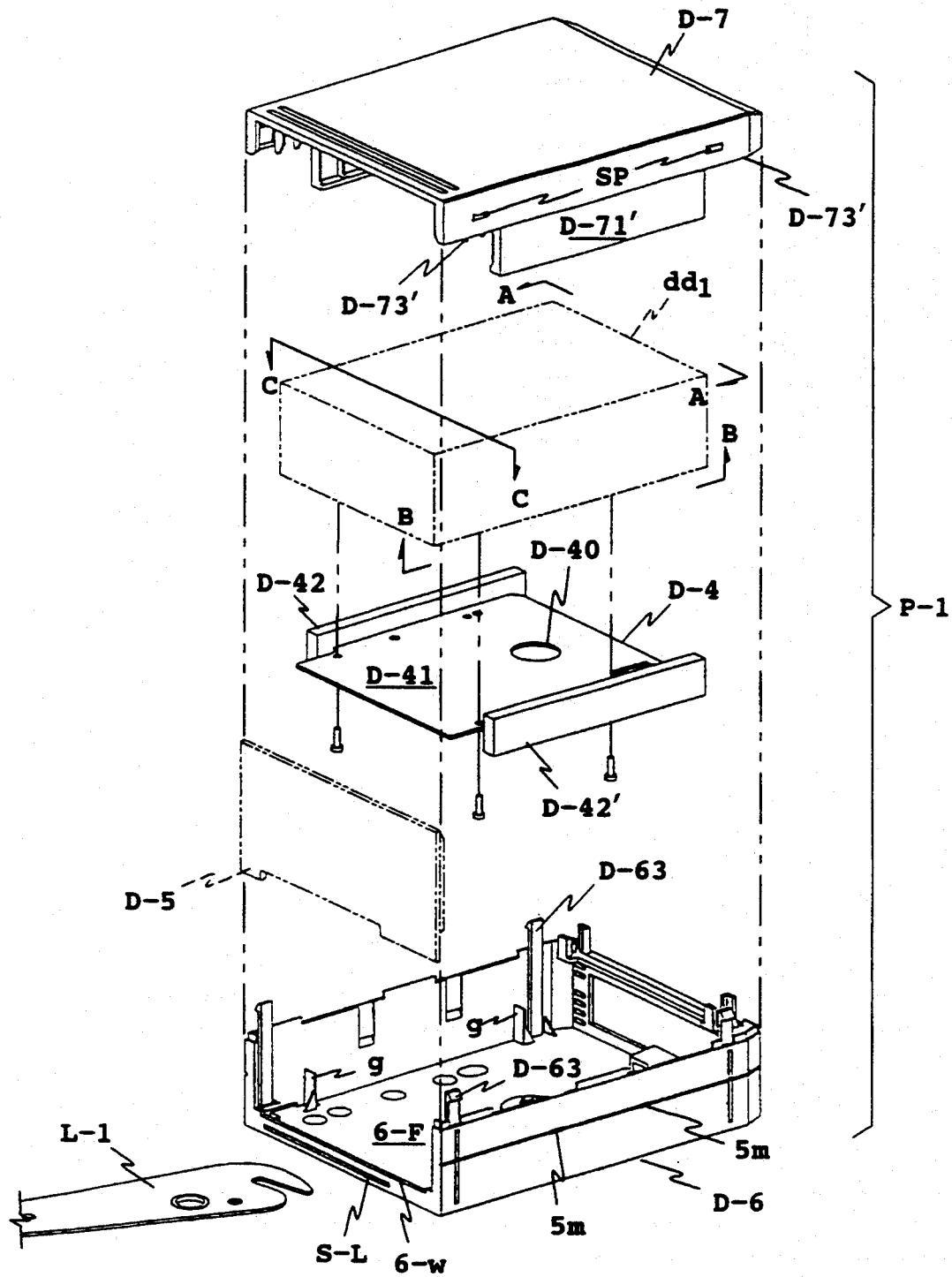
Figure 16-C

Figure 19-B

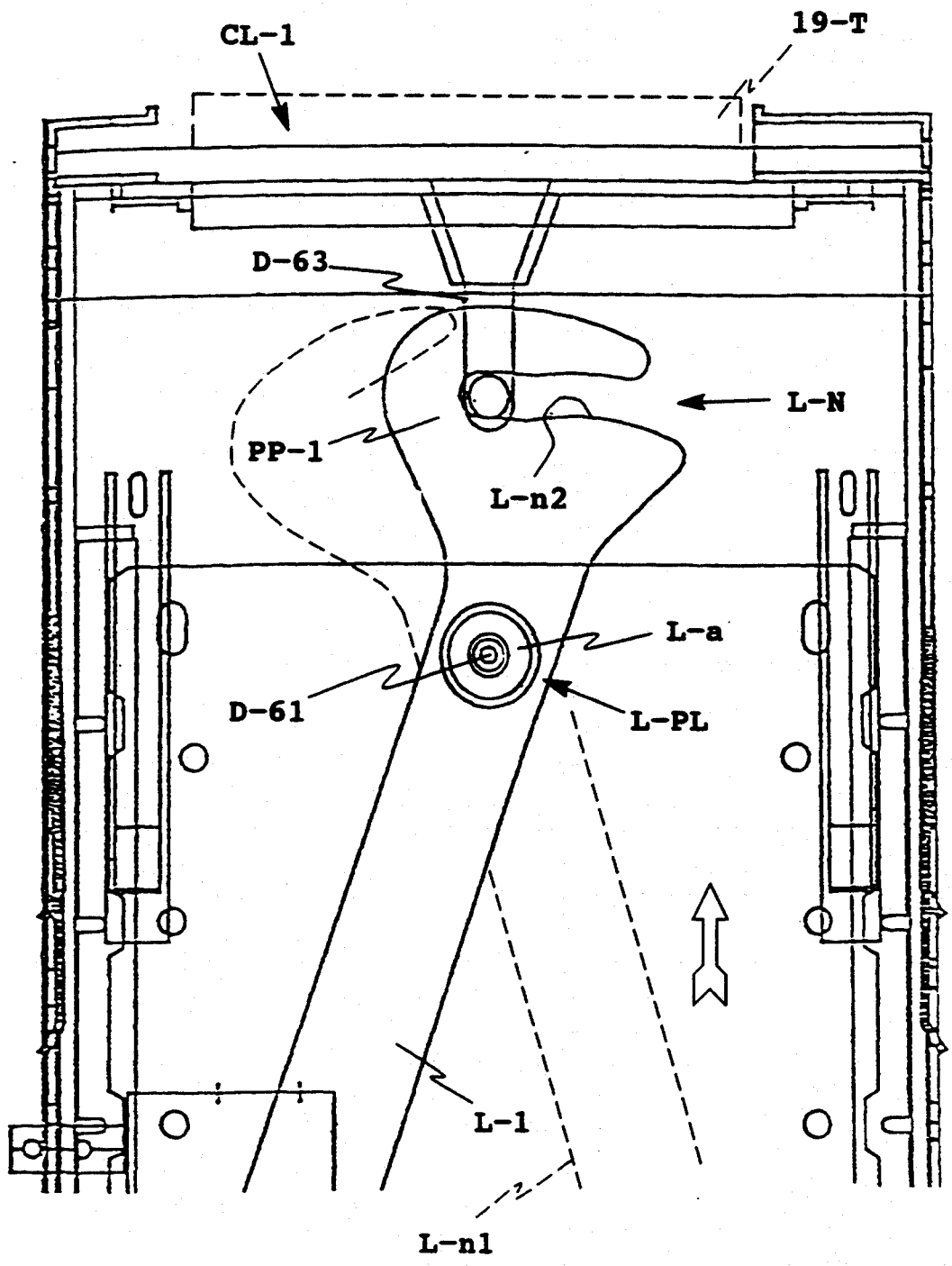
Figure 19-A

REMOVABLE MEMORY MODULES

This application is a continuation of patent application Ser. No. 07/930,921, filed Aug. 13, 1992 now abandoned.

This invention relates to computer equipment; and, more particularly to storage units therefor.

BACKGROUND FEATURES

Workers in the art of making and using computer equipment realize that one must emphasize simple design and ease of manufacture, particularly for popular, general-use equipment. An object of this invention is to provide such, using a simplified layout, with memory component units that are unitary modular and readily integrated.

One should take care to design parts that are self-protected from abusive or dangerous handling; e.g., when a user removes and stores a memory unit, he might mechanically damage it (e.g. drop it). A noteworthy object hereof is to avoid this by packaging such units in modular, essentially identical protective envelopes.

Packaging memory units in modular "boxes" can render an array of plug-in/unplug units for a computer; such modules are easy to handle, easy to secure, and easy to remove and store (e.g. in a high-security site, like a locked desk or safe—or even to carry on one's person, as with a removable car radio.

Workers may also recognize that the organization of computer assemblies is all too apt to be complicated, making assembly and part-replacement,rather complex and time-consuming. Thus, another object hereof is to segregate functional units like a memory stage, like packaged circuit cards, like a power/fan unit and like a motherboard unit—making each of these relatively independent, self-contained, modular and easily assembled together, doing so quickly and easily, without need for special skill or tools. More particularly, an object is to make such modules easy to mount-upon, and plug-into, a common computer base.

A further object is to provide a snap-on cover for enclosing such an array of on-base mounted units, yet still allow the user to pick-up the computer by its cover. A related object is to provide such a cover in cooperation with a disable-switch arranged to disable system power when the cover is removed.

Another object is to address at least some of the foregoing concerns and teach ways of ameliorating them.

BRIEF DESCRIPTION OF DRAWINGS

These and other features and advantages of the present invention will be appreciated by workers as they become better understood by reference to the following detailed description of the present preferred embodiments; these should be considered in conjunction with the accompanying drawings, wherein:

while

FIGS. 12, 12A show the disk bay of the unit in FIGS. 8–11, exploded-away, with a lock therefor shown in FIG. 13, an upper-bay portion thereof in FIG. 14, and a disk module therefor in FIG. 15;

FIG. 16A is a skeletal view of the module in FIG. 15, with FIGS. 16B, 16C, exploded views thereof, with FIGS. 17, 18 showing portions thereof, with FIGS. 19A, 19B showing a section thereof as installed, and with FIG. 20 giving a plan view of a handle portion of the module.

The invention will be better appreciated by workers upon consideration of the following detailed description of preferred embodiments.

DESCRIPTION OF PREFERRED EMBODIMENTS

General Description, Background

The means discussed herein will generally be understood as selected, formulated, and operating as presently known in the art, except where otherwise specified, all materials, methods, and devices and apparatus herein will be understood as implemented by known expedients according to present good practice.

Figure 1:
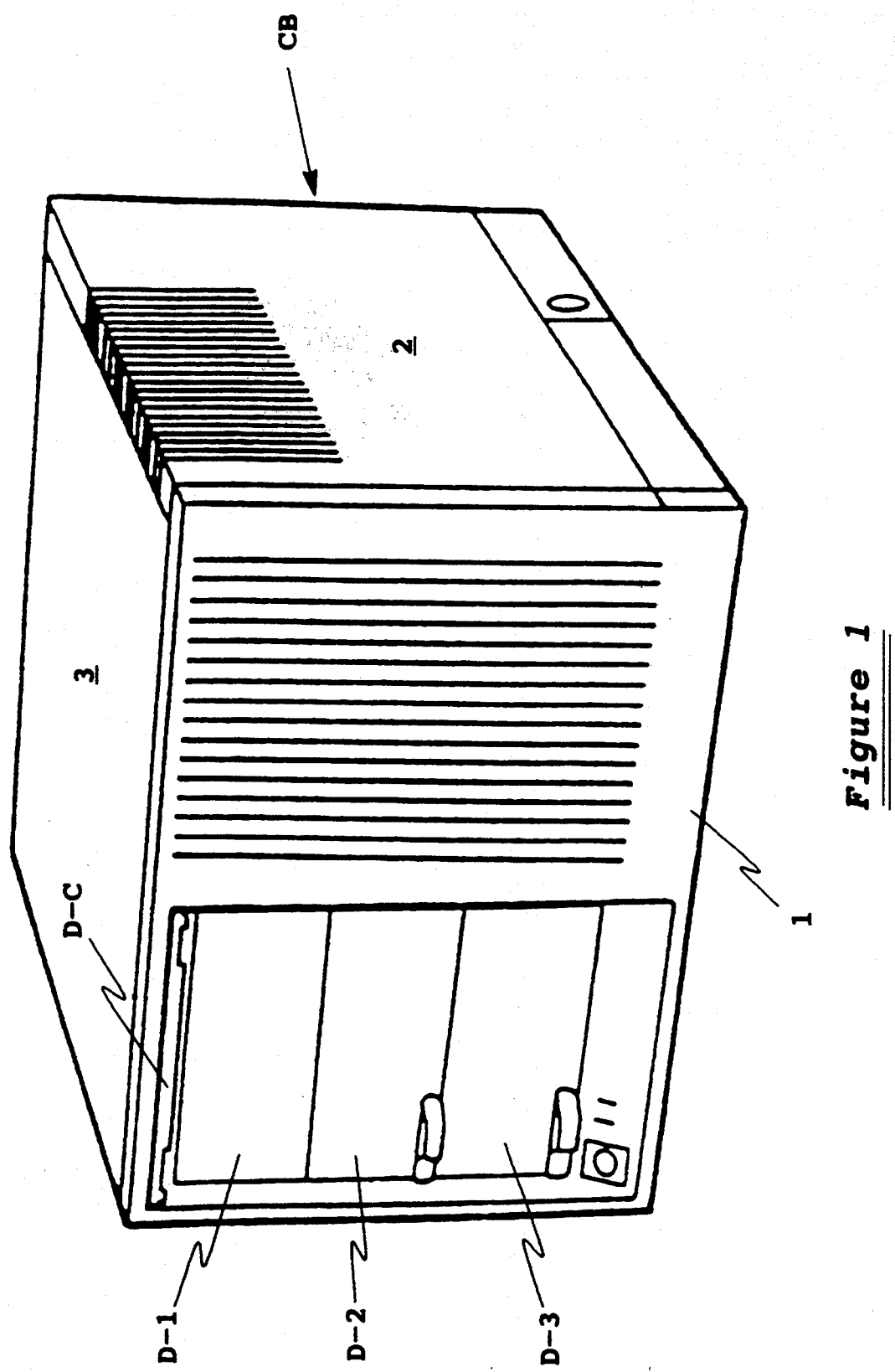
FIGS. 1 and 2 are respective side and elevation views of a computer unit containing modular memory units according to a preferred embodiment hereof (with a removable front cover superposed in FIG. 2)
Figure 2:
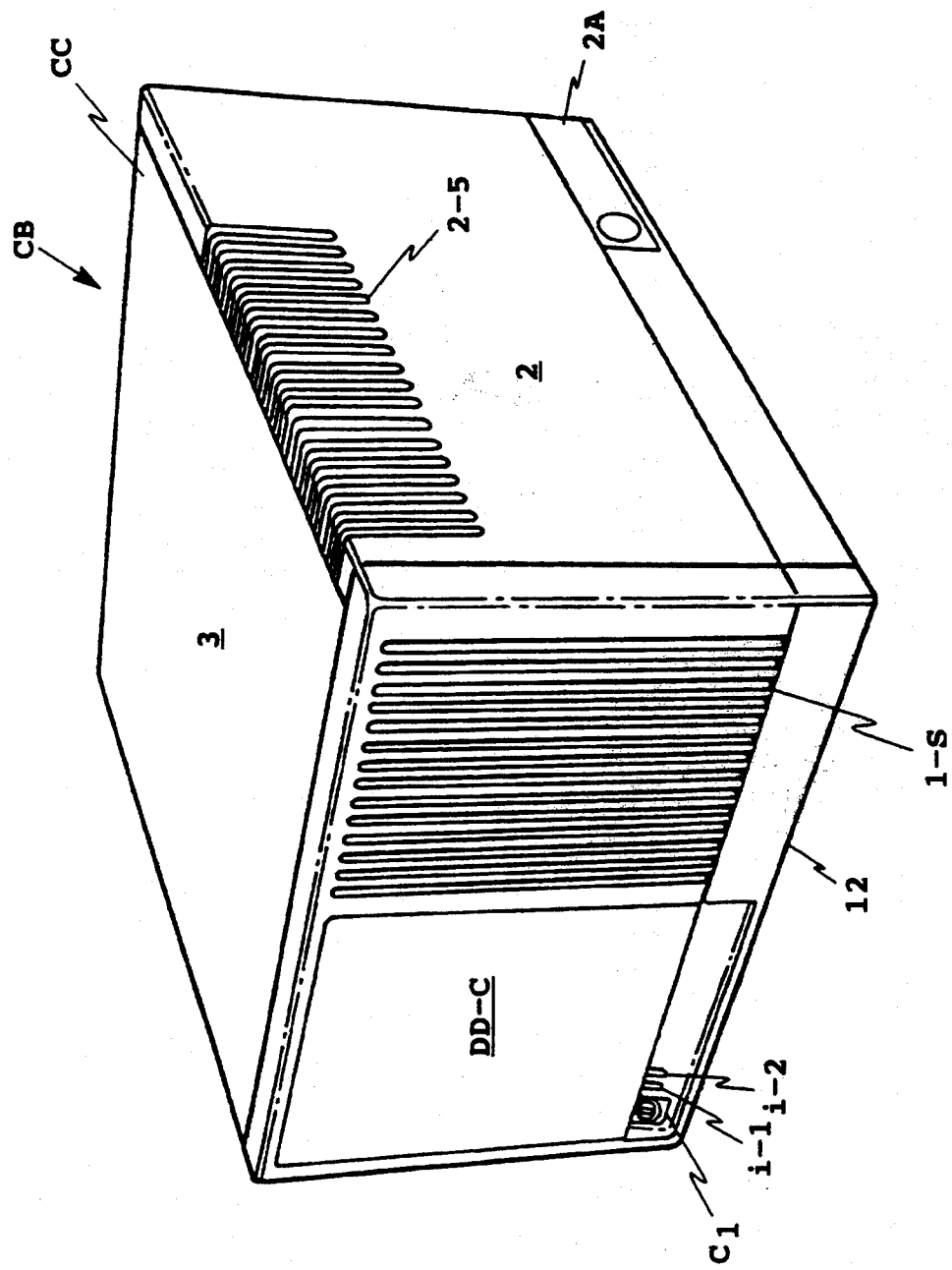

As seen in FIGS. 1 and 2 for instance, one preferred embodiment is part of a desktop computer array including a control unit CB (and associated monitor with detachable Keyboard—these not shown). The control unit CB will be understood as comprising a base structure 7 (housing a motherboard MB under deck 7-P see FIG. 3) on which are mounted a power unit 20, a disk drive array 10 and various card packages 30 plugged-onto the motherboard.

The computer is configured for a specific application by selecting the appropriate set of functional (card) modules. Functional modules can be plugged into deck 7-P of base 7 (as 30) or comprise a like Expansion Unit. Support for several SCSI and computer busses (other that the MB-Bus for motherboard) is provided; e.g. XBus, ATBus, and MicroChannel are supported. A non-MB-Bus compatibility matrix is also provided.

The computer is also modem-connectible e.g. for remote test thereof; for instance, a plant engineer may diagnose a problem remotely, by modem; and then mail a replacement part to the user.

Control Unit CB may be any convenient size (e.g. we prefer about 9" height×12"×12", at about 25 lbs).

PREFERRED ARCHITECTURE

The subject computer is preferably configured as a modular 32-bit desktop computer capable of containing multiple processors.

Modularity is provided by having most functional sub-assemblies be user-installable in small functional modules (e.g. the daughter-circuitboards inside plastic enclosures 30 functioning as modular envelopes or packages for circuit cards). Another major sub-assembly so packaged is the disk array 10 (e.g. hard disks and floppy). Expansion is accommodated, to allow more functionality, by providing for add-on modules.

Five circuitboard modules (e.g. see 30, FIG. 3) can be plugged into the basic control unit (and/or Expansion Units), allowing for a total of ten functionality (card) modules (cf. five on base 7). Three 3½", full-height disk storage modules (e.g. D-1, D-2, D-3, FIG. 3) can be inserted into basic unit CB or into an Expansion Unit. The electronic aspects of this modular architecture allow the machine to grow form a single processor, high-performance workstation to a multiple processor, multi-tasking, high end server.

Architecture will be understood as IBM-compatible (e.g. with PS/2 Model 80 at the register level). Added to this, preferably are a high performance cache, a closely-coupled local bus (S-bus), a high performance backplane bus (MB-Bus) along with capability for multi-processor and shared memory/private memory. A high performance Multi-Processor Backplane Bus (MB-BUS) will accept MB-BUS modules directly, as well as XBus (expansion) modules, AT Bus cards, and Micro-Channel cards through adapters.

The Basic Unit CB (or an Expansion Unit, SPU) and associated memory units can communicate across a high speed S-Bus (a 32-bit bus running at 32 MHz, providing a maximum data rate of 32 million 32 bit "Double Words" per second, or 128 MByte/second). A Multi-Processor Backplane Bus and the MB-Bus, couple system enclosures.

CONTROLLER UNIT

Figure 3:
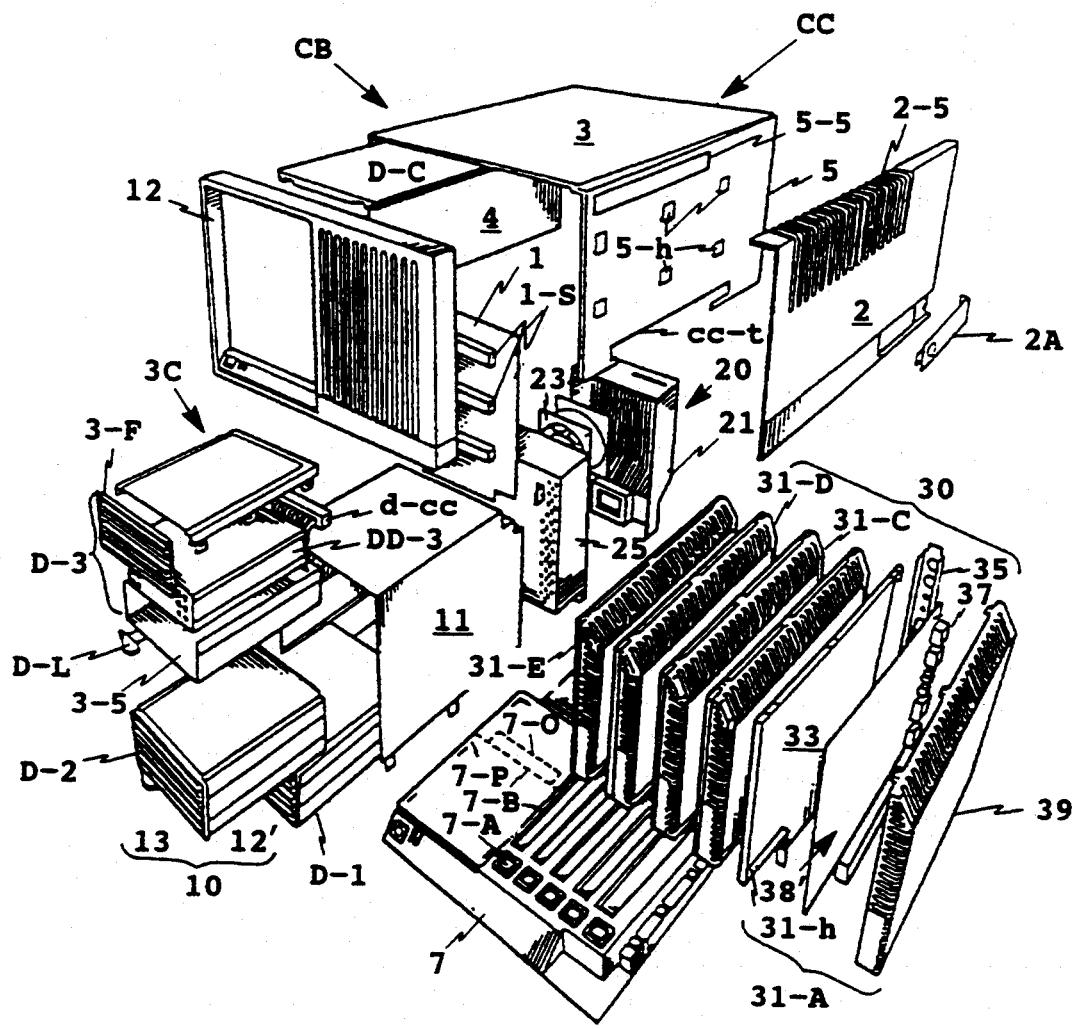
FIG. 3 is an enlarged perspective view of the computer with parts exploded-away from clarity.

Controller unit CB is shown in schematic perspective views in FIGS. 1, 2 and 3.

These Figures show the exterior of a U-shaped cover assembly CC (i.e., comprising a pair of side members 4, 5 bridged by a connecting top member 3). Side member 5 includes air-entry 5—5 and is covered by a side-panel 2. A front panel (bezel) 12 is attached across the front of assembly CC.

Front panel member 12 is affixed (e.g. by sonic-weld) to the U-shaped cover CC. Essentially all parts (except transformer unit) are made of plastic, and are inter-connected by snaps or similar means, without use of screws of other threaded connectors—this giving a minimum of sharp edges.

As best seen in the exploded view of FIG. 3, cover assembly CC encloses interior functional units which, in turn, are connected, along with cover CC, to base member 7. Except where otherwise specified, all members are preferably constructed of ABS, Delrin or similar plastic (monitor is poly-carbonate).

More particularly, base 7 mounts, and cover assembly CC surrounds, a memory (multi-disk-drive) unit 10, a power supply unit 20 and a set (30) of insertable circuit modules 31 (five modules shown).

Communications cables to unit CB plug onto 25-pin D-type connectors. A 25-pin female bi-directional parallel port connector and 25-pin male asynchronous "RS-232" connector are mounted on the MB-BUS backplane board. These are right-angle connectors which race the rear, of base module CB. There are also two female 25-pin D-type connectors for connection to synchronous RS232 devices on an SGL-100 I/O panel. RS-485 (cluster) cables can be attached to two 8 pin mini-DIN type connectors located on the SGL-100.

Figure 11:
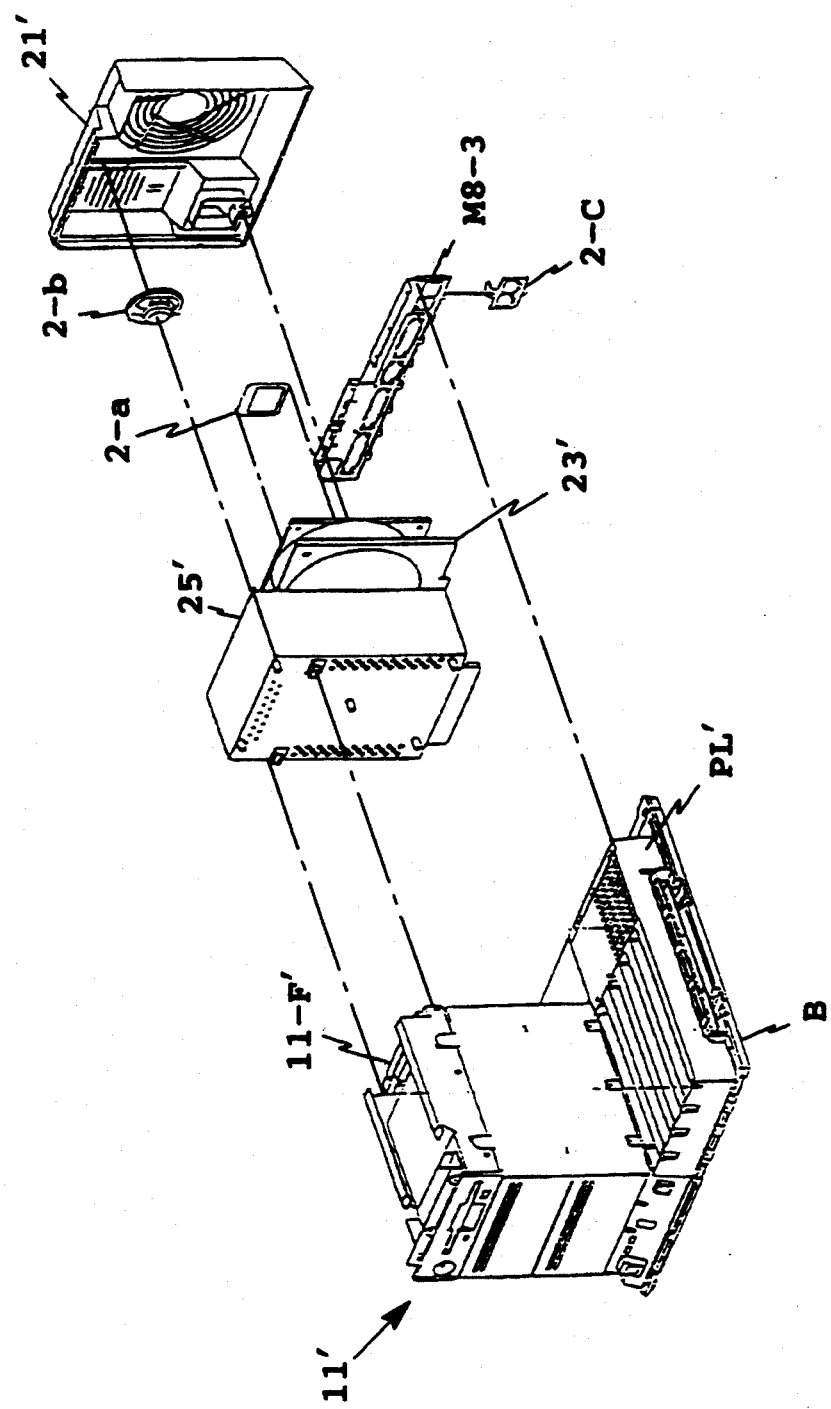

Disk drive array 10 comprises modular drive packages D, in a U-shaped frame 11 which is mounted, via snap-in tabs, on the surface of base 7 (e.g. see FIG. 11). Frame 11 includes means for slide-in mounting of several identical superposed disk drive packages, each with rear connectors, i.e. modular disk drive packages D-1, D-2, D-3 as known in the art (cf. connector card 1 having electrical receptacles 1-S and connected to receptacle on motherboard MB).

An exemplary drive package D-3 is exploded (FIG. 3) for descriptive purposes and will be seen as including a disk drive dd-3 (preferably, a 3.5" hard disk unit including lock means and electrical connectors means d-cc adapted to be mated with respective pin connector means 1-S on card 1 at the rear of shell 11, when the drive D-3 is fully inserted into its respective slot in shell 11).

Disk drive module DD-3 will be seen as housed in a U-shaped vessel 3-5 (FIG. 3), being covered therein by a cap member 3C, with a facing 3-F coupled at the front to 3C and 3-5 (all members being made of plastic and snap-fit together as known in the art). Workers will appreciate that each drive module D-1, D-2, D-3, will be arranged and adapted to fit snugly into its zone within shell 11, e.g. each respective vessel 3-5 being adapted to interfit slidingly inside frame 11 as known in the art.

Enclosure CC (3, 4, 5, 12) has "key lock" means so that, in the locked position, the enclosure cannot be removed, thus preventing functional modules from being inserted or removed ("unlock" to remove) while the system is "hot" (power ON).

A disk drive module can be removed by a user from the "Storage Module Bay" (in frame 11) without opening the enclosure, when power is off. The drive modules have a handle to pull the modules from their Storage Bay (covered by door or cover D.C., see FIG. 1).

As workers realize, each drive module (D-1, etc.) is to be manually inserted and extracted for its respective position in shell 11. To facilitate this, a drive-lock assembly (and handle D-L is provided along the base of each vessel 3-5, being adapted to be thrown from a "Locked" position, (as with D-2, FIG. 1), to an "Unlocked" position (as with D-3 in FIG. 3) when the unit is to be removed. The locking action will be understood as acting to engage/disengage connectors d-cc from respective pins in 1-S as known in the art—as well as providing a somewhat central grip for a user when extracting the drive. The "locking action" is invoked to pull-in a drive the last fractional-inch; i.e. after insertion of the drive almost "fully-into" shell 11, displacing handle D-L from its "open" (center) position to its "closed" (side) position will automatically further-insert connector d-cc and the entire unit back against mating pins (1-S) and provide for firmer mechanical/electric connection as known in the art.

The disk drives may comprise any compatible units; e.g. three identical modular 3.5" full-height disk drives so enclosed in plastic—these being SCSI-compatible with self-contained controllers and data separators (e.g., 19 msec access time; formatted capacity of 40, 80, 140 Mbytes). A SCSI bus activity indicator LED (C1, FIG. 2) is preferably provided to be visible at the front of Controller CB even when access-door D-C is closed.

Behind disk drive array 10 (FIG. 3) and mounted on motherboard MB, is the Power assembly 20 including a transformer unit, surrounded by a cage 25. Behind the transformer unit is a fan unit 23, and behind the fan is a perforated plastic exhaust screen 21 (seen in FIG. 3). Power unit 20 is electrically connectible with "house power"; it will typically provide about 200 watts and operate safely up to about 18° C. above ambient. Unit 20 feeds power to disk array 10 and motherboard MB. As indicated in FIG. 3, platform 7-P is disposed operatively adjacent, Power unit 20. This gives access to under-portions, allowing fan 23 to pull air from within base 7 across motherboard MB (from right to left) and expel it outwardly through the slots in screen 21.

Each such controller unit CB (or Expansion Unit) has its own power supply. These AC-input supplies provide up to 204 Watts or regulated DC output-power, and they are "auto-ranging" (i.e. they automatically adjust to AC input voltage, 115 V or 230 V nominal, with no external switch required). They will support a Power Enable (PWREN) signal allowing an external power supply to be controlled by an on/off switch on the Controller CB. The Controller CB (and the Expansion Module) has an "IEC-compatible" AC-input connector, which can be used with nationalized power cords.

The MB-BUS will be assumed to comprise a single piece, 182-contact, dual row (0.050" centers) connector. Motherboard MB has an edge connector, while card-modules 30 each have gold plated card edge-contacts. There are five MB-Bus connectors on the MB-BUS Backplanes of the Base (and Expansion) Module. Motherboard MB preferably provides the functions of: processor and memory I-O control; it may include a CPU chip and may interface to the rest of the system via S-Bus and MB-BUS.

This computer, with its basic set of modules, preferably also includes a few physical interconnects, such as a keyboard connector, the AC connector (at rear of CB), a Cluster/LAN connector, and RS232 communications connectors.

Flanking the disk drive and power supply units is an array 30 of circuit modules 31 (five pictured, FIG. 3), each adapted for manual insertion into, and withdrawal from, an associated connector on motherboard MB, through a respective receiving slot 7B in deck 7-P.

According to a feature hereof, each circuit package 31 is "modular" and identical except for its inner contents and it's end-cap 35. For instance, exemplary package 31-A houses (FIG. 3) a printed circuit board 37 connected to its motherboard-contacts and its end-cap 35, being encapsulated, in "clamp shell fashion", between a receiving plastic shell 39 and a mating plastic cover 33,—parts 33, 35, 39, being interconnected with snap means as known in the art. The other: modules 31-B, 31-C, 31-D, 31-E are independent and essentially identical outwardly.

Figure 5:
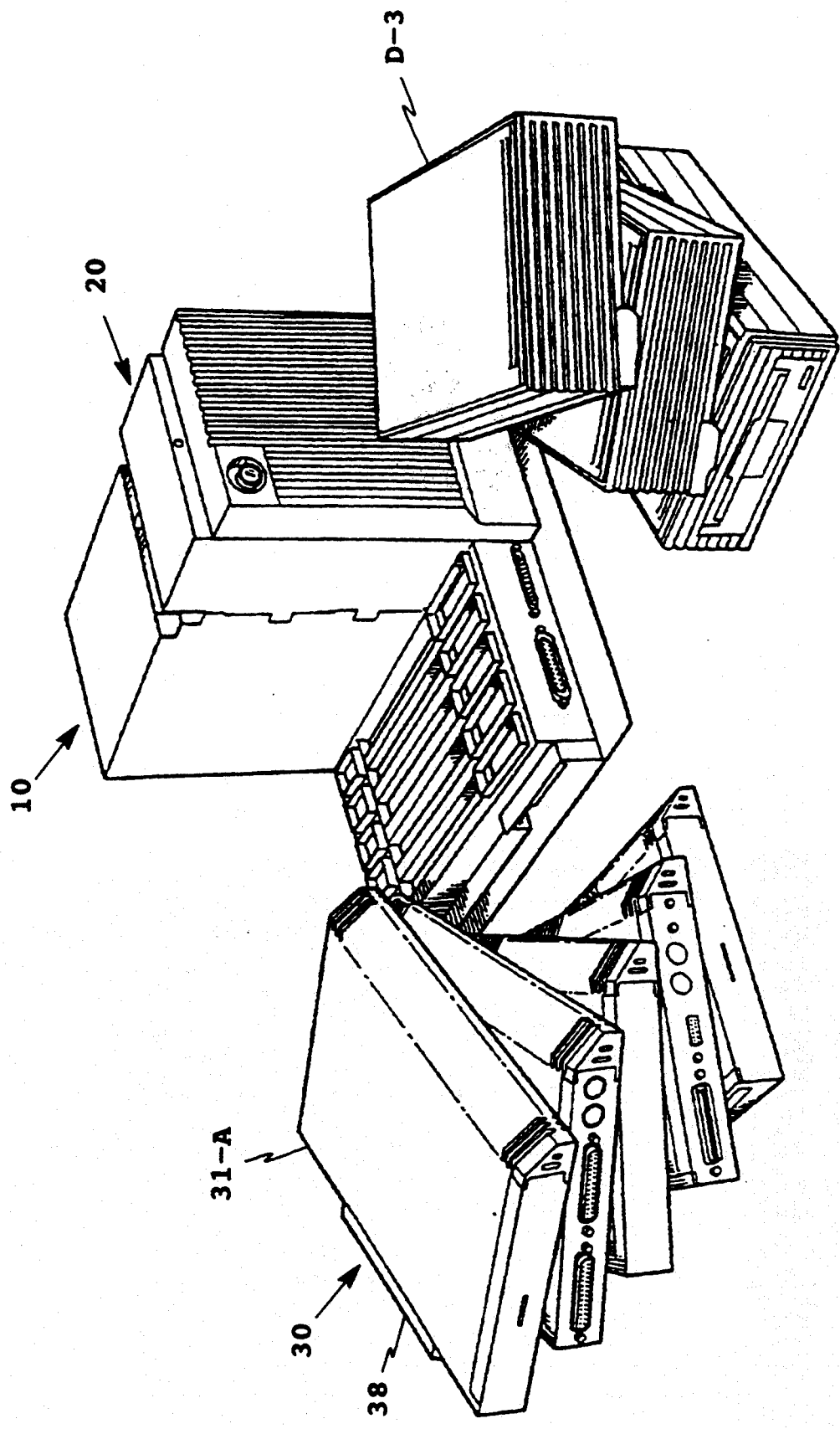
FIG. 5 is a side-rear perspective view of the computer with memory units and card-packages removed.

FIG. 5 is a side/rear view of Controller CB without covers. Here, note Disk drive/Unit 10 and Power Supply 20 mounted on base 7, with the three disk drives (e.g. D-3) stacked separately nearby, as are five separately stacked circuit modules (e.g. 31-A).

Figure 6:
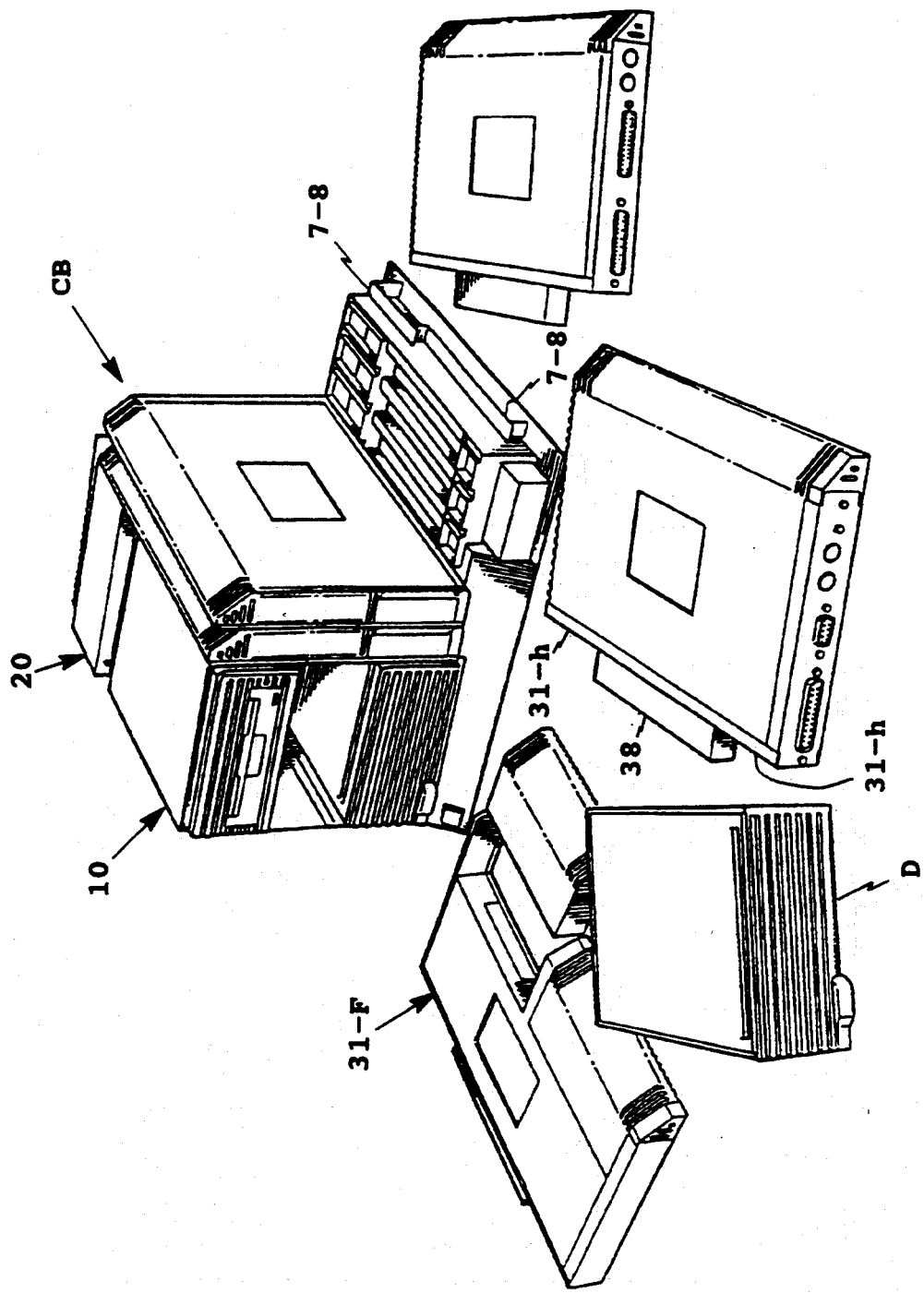
FIG. 6 is a like view but from the front, with two memory units in-place and two card-packages in-place.

FIG. 6 is a similar depiction (but from the front) where two disk drives have been inserted in unit 10, and two circuit modules inserted through deck 7-P.

The Base Unit motherboard, preferably, has six sections. One section contains SCSI control logic and buffering, this connecting internal storage modules to a terminal for storage devices (also see FIG. 7).

Assembly of Controller Unit

Referring to FIG. 3, it will now be evident that the functional units of Controller CB may be independently fabricated (e.g. completed at different sites, then shipped to user-site, or to an assembly-site, where the entire Controller may be very quickly, and easily put together without specialized tools, labor, etc.—similarly for replacement parts). That is, once Base-plenum 7 is completed (with motherboard, etc. installed), one can use this as a platform for mounting a completed disk drive array 10, a completed power unit 20 and completed circuit modules 31 (one to five).

Disk drive assembly 10/11 may be pre-assembled as a completed multi-drive unit before mounting on Base 7. With disk array 10, housed within shell 11, shell tabs can inter-lock (removably) with receiving slots in deck 7-P, as schematically indicated in FIG. 3 and as known in the art.

Thus, the pre-assembled units [disk drive, power and card modules] can easily and quickly be inserted onto the Base 7 in finished form (e.g. by the user)—a novel and significant feature.

Cover Assembly

Controller CB is now ready for application of cover assembly CC; that is the U-shaped cover CC, 4, 5 with sides; and top 3 (cf. Cut-outs CC-T on sides 5,4 are adapted to receive respective brackets 7-B on Base 7,—when cover CC is dropped onto base 7 registering the slots with bars 7-B—then slid lockingly to the "rear".

Panel 2 will be appreciated as attached via hooks 5-H (snapped-on) or the like (no screws, etc.) which are "hidden".

This enhances aesthetics and appearance, while also enhancing safety of operation. Panel 2 has an array of thru-slits, or vents, 2-5 along its top edge and upper side—these being understood as positioned and arranged to allow outside air to be drawn inward through communicating slot 5—5 in side 5, and beyond into each card module 31 (see FIGS. 1, 3).

Snap-in cover 2 fits over the MB-Bus connector onto the side of Controller CB (and likewise on the Expansion Unit). The SCSI connector has a separate cover which snaps-on next to the MB-BUS cover. If the SCSI cover is removed, external SCSI devices may be attached to the exposed SCSI connector with a cable. MB-Bus SCSI parts have a built-in active terminator, which removes the termination burden from the user; but when SCSI devices are hooked-up externally, external termination must still be provided.

Controller unit CB is contemplated for coupling to a related Expansion Unit by sliding the units together and installing a removable "latch plate", (via hooks 5-h) which is provided with the Expansion Unit. One must first remove sidecover 2, however, before attaching the Expansion Unit. Cover 2 can then be similarly attached on the right side of the Expansion Unit.

Disk drive cover D-C may now be inserted along receiving channels (FIG. 1) under the forward portion of covertop 3, this cover D-C being arranged to be slidingly inserted therein for storage and, when withdrawn fully, allowed to pivot downward to cover a respective disk bay—e.g. note that cover D-C and all drives are "removed" in FIG. 2 (bay DD-C empty) but cover D-C is "open" (retracted) in FIG. 1. Base 7 is provided with suitable indicators, such as controls, on/-off switch C-1 (see FIG. 2) and indicator lamps i-1, i-2, as well as a "key lock" K-L, as above-noted.

Any disk drive module can be removed from its "Storage Module Bay" (in frame 11) without opening the enclosure cover as along as power is "off".

The "storage modules" (disk drives within their enclosures) are user-installable and are removable without the use of special tools. Each drive is mounted inside an identical plastic enclosure, with a handle to allow the drive to be easily removed form the system. Drives can be removed, when power is off, after the user issues a specific command for this, either while the system is operational, or when cover CC is removed. When power is off and one or more drives have been removed, the remaining drive(s) can be locked in place manually. Drives can only be inserted when the power is off, and then manually locked-in. User feedback is provided to show that the storage modules are locked-in. A carrying case is preferably provided for each drive once it is removed.

Figure 4:
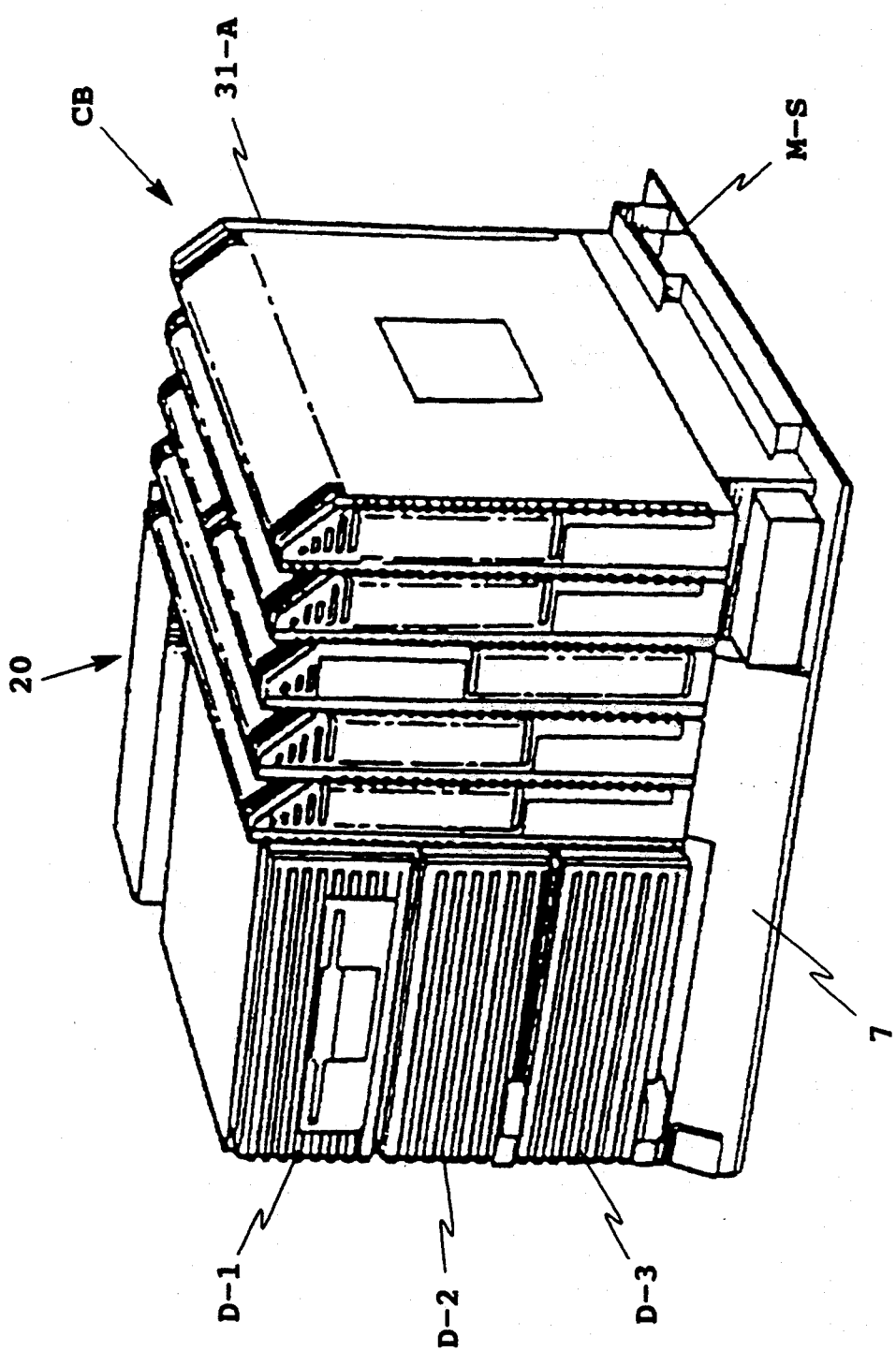
FIG. 4 is, essentially, the view as in FIGS. 1 and 2 with cover removed.

A protruding micro-switch M-S is disposed along the side of base 7 (FIG. 4). It is adapted to be closed when panel 2 is slid from left to right across side 5 (engaging hooks 5-h (FIG. 3)) with its own hooks to cover CC so that it doesn't come off when one lifts the entire unit by its cover. Micro-switch MS will preferably protrude (behind cover 2A) and normally be in "Disable" condition until panel 2 is so thrust, fully into its closed position, thereby depressing micro-switch M-S into "enable" condition (e.g. to activate the entire computer system. This is a safety feature which is preferably provided to ensure that the system cannot be operated unless the covers are in place—thus preventing insertion or removal of parts (particularly card modules 31) when the computer is "ON" or when a disk drive etc. is "ON".

Workers will appreciate that the system will thus not allow a card-module 31 to be inserted or removed while the system is operating. More particularly, one thus can not turn-on the system without enclosing it inside (attaching) cover CC, including panel 2. This will prevent insertion of a card during ON-time; thus, the system can not be tampered with while operating.

[Side 5 and hooks 5-h are alternatively used to attach a second, like controller box CB' or Expansion Module.]

Controller assembly CB thus provides complete, user-friendly, safely-handled sub,assemblies; i.e. the disk drive, power and circuit module units (as well as cover pieces). These, or replacements therefor, can be manufactured remotely from the site of assembly/use, (e.g. be shipped separately to a user in kit form, with the user doing his own final assembly and test)—yet without risk of malfunction without elaborate directions, without needed for screws or other threaded connectors, without delicate machinery or dangerous parts being damaged by handling and involving only the plugging-in and snap-in of a few units onto a receiving plenum-base. The safe, snap-in, plastic-enclosed sub-assemblies house and protect all delicate, "untouchable" parts. Assembly can be performed in a fraction of the time required heretofore (e.g. 1/5 the usual time would be typical)—with no internal wires to be connected, no screws, no parts to be screwed or bolted-together etc. Further background on all the foregoing may be had by reference to U.S. Pat. No. 5,006,959.

Alternate Embodiments, FIGS. 8–20

FIGS. 8–20 depict another related computer embodiment CB' which may be understood as essentially the same as the aforedescribed in all respects except as otherwise specified hereafter.

Figure 8:
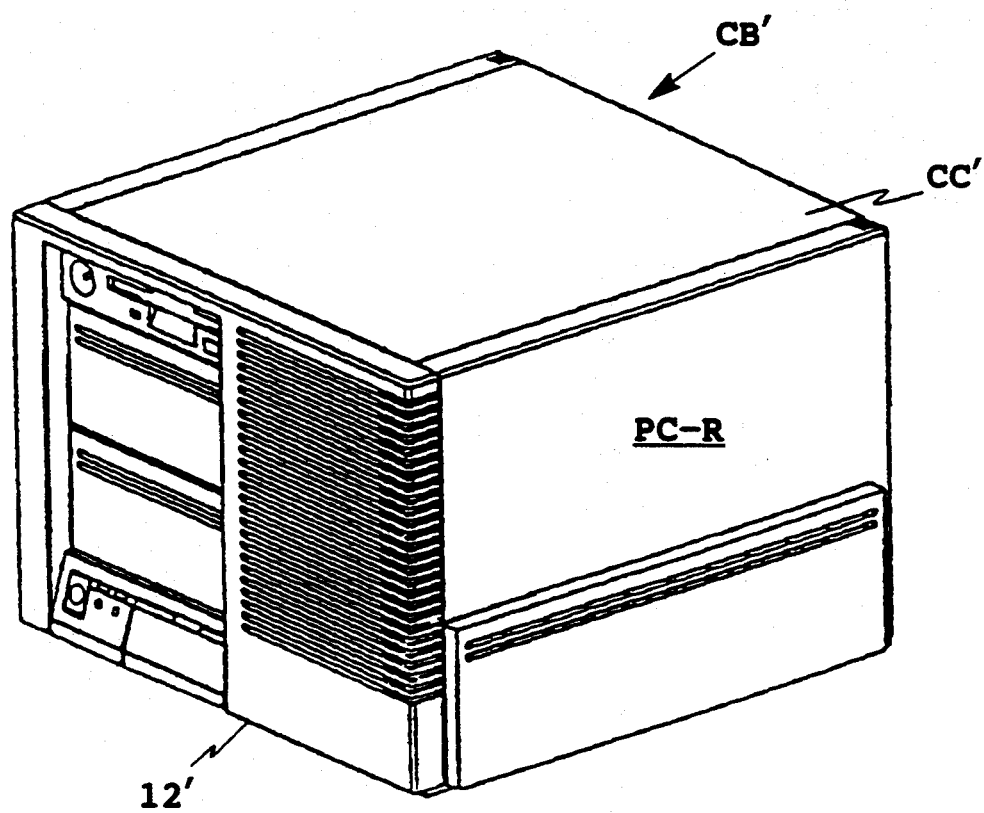
FIG. 8 is a variant of FIG. 1, showing a computer unit CB', with FIGS. 9, 10, 11 showing it partly disassembled.
Figure 9:
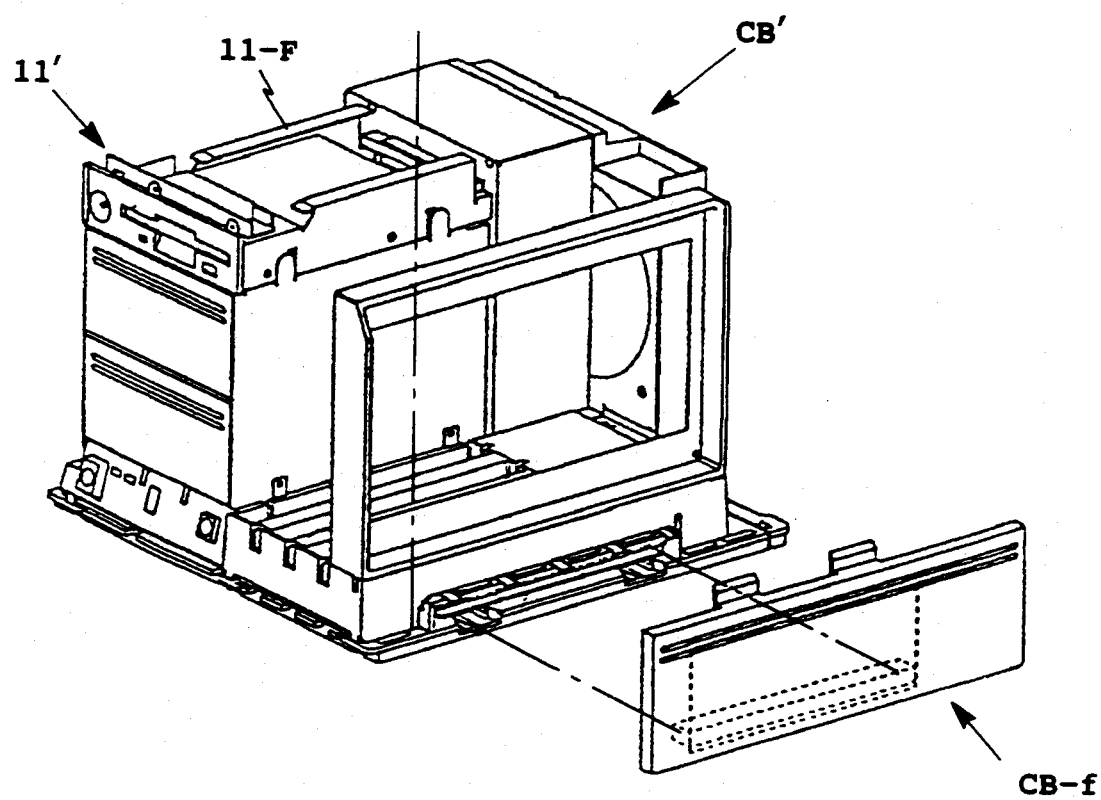
Figure 10:
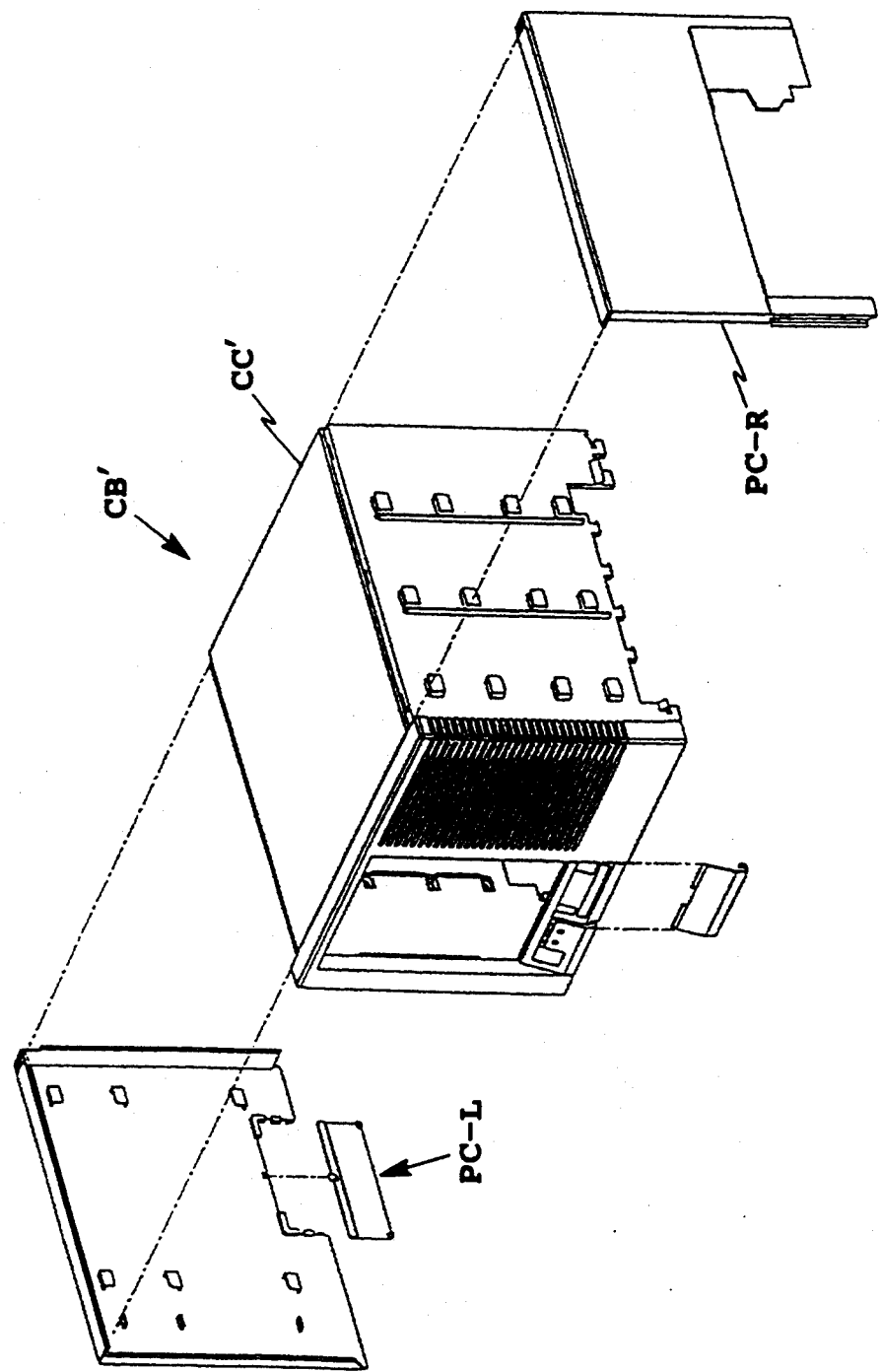

FIGS. 8, 9 depict a desktop workstation computer CB' which, as mentioned, closely approximates computer CB above (e.g. see FIG. 3), being shown in FIG. 8 with its front bezel 12' installed, along with its U-shaped (top-sides) cover cc'. FIGS. 9, 10 in partial, skeletal form, show this with bezel 12' and cover cc' removed; while FIG. 11 show the like, with fan-cage 23' exploded off its power-cage 25', and with rear-cover 21' exploded-away from 23'. Adjacent power cage 25' is disk bay frame 11' (analogous to 11 above) seated on a "plenum-type" base assembly PL' (analogous to 7 above).

Figure 12:
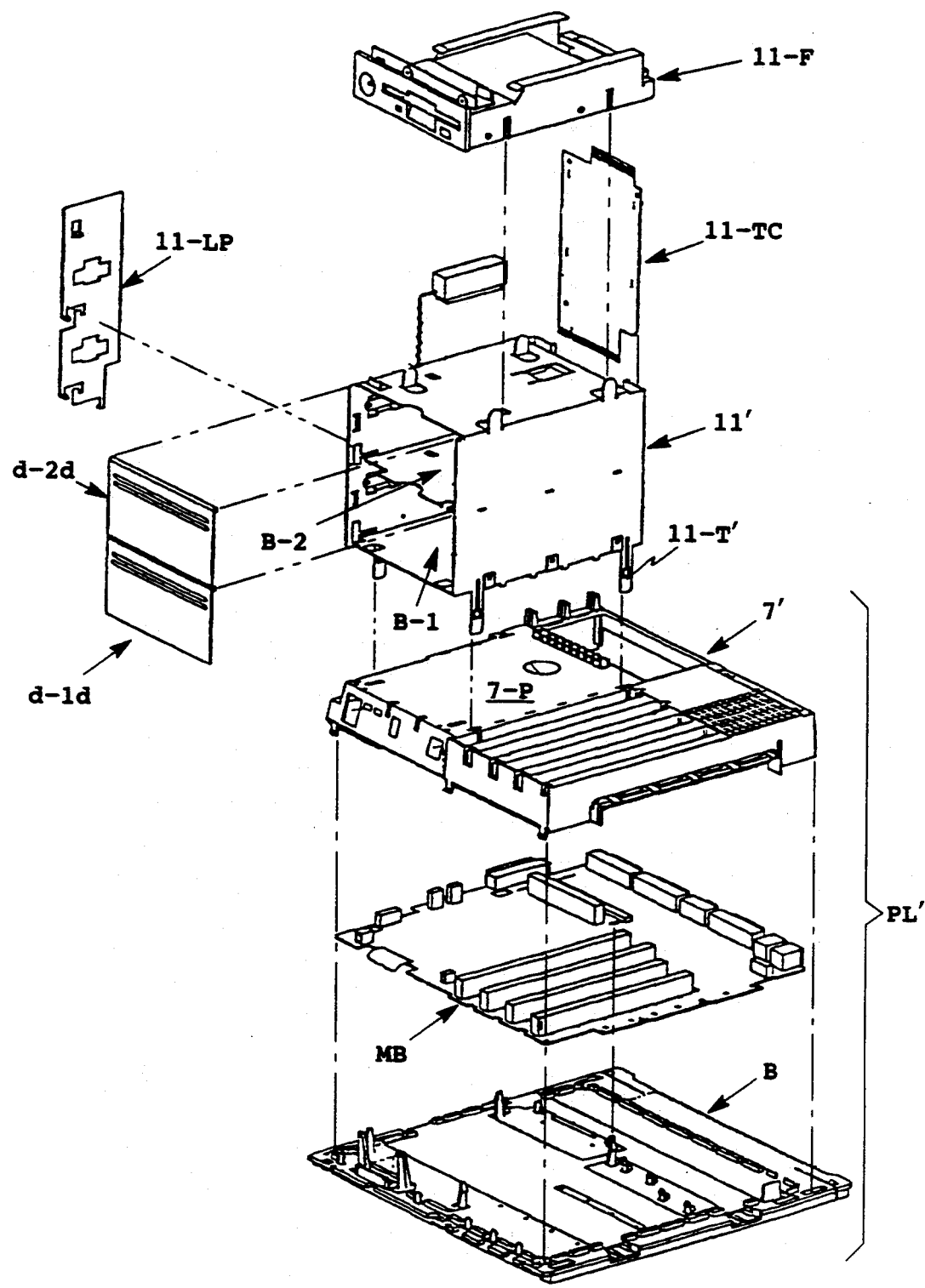

Disk bay elements of FIGS. 9, 11 are exploded vertically in FIG. 12, including disk frame 11' shown detached from plenum PL' (see snap-in tabs 11-T' adapted to be fitted into receiving holes in the top of PL'). Plenum PL' includes a motherboard MB adapted to be mounted on a base B, with plenum cover (deck) 7' secured on base B to enclose and cover motherboard MB and provide a plenum chamber in the aforedescribed fashion. An I/O panel will be understood as adapted to be attached on the rear side of 7'. A T-card connector 11-TC will be understood as carrying connect lines between all disk drives in frame 11' and motherboard MB (into which it is to be plugged).

As detailed below, frame 11' and connector-card 11-TC are adapted to receive two removable, portable disk drive modules which may be manually inserted into/removed from frame 11', and selectably locked therein. Frame 11' preferably also houses a floppy disk/lock unit 11-F, installed thereon. Unit 11-F includes a lock/unlock assembly (including plate 11-LP) adapted to lock-in the disk drive modules etc. while also mounting a plug-in floppy drive unit (e.g. see FIGS. 12, 12A; see floppy drive unit FD in FIG. 14 and associated connect-harness FD-h). Workers will be impressed with how readily and easily computer CB' may be assembled, without tools or threaded connectors, simply snapping MB, then 7' onto MB, then snapping 11', 11-TC etc. onto 7' to render the assembly in FIG. 9,—then; snapping-on cover cc' and bezel 12' to yield the unit of FIG. 8.

Workers will also recognize what an advantage this is for today's desktop and other small computers—whose reduction in size makes it more feasible, whose reduction in cost makes it more necessary: i.e. today's customer/user may now be asked to take on tasks (e.g. original computer set-up) which were formerly performed by highly skilled maintenance and service personnel. Today, many prefer that a computer be purchased in the form of subassemblies which are carried away and later assembled. This means that set-up and installation must be performed by the customer, without any particular electronic skills. Thus, set-up and installation should be very simple and virtually foolproof. Proliferation of electronic devices in the work place and home has placed people with essentially no electronic knowledge or skills in the position of purchasers and users.

Thus, workers will see how advantageous our snap-in subassemblies are, requiring little or no instruction (e.g. since the connectable subassemblies are readily recognizable for what they are, what they do, and where they go) with no tools or threaded connectors needed.

Memory Stage, In General, FIGS. 13–20

FIGS. 13–20 depict various aspects of the memory units P (in frame 11') and floppy drive FD (in frame 11-FF) of this deskstation embodiment CB'.

Workers will understand that computer CB' typically houses central processing electronics (the "CP"), memory chips (e.g. many in removable envelopes) and other electronics, along with the memory units in frame 11', these preferably including (here) a floppy drive/lock array 11-F fixed in the machine (atop 11') and a pair of removable hard disk drive modules P-1, P-2, each to be removably inserted in one of the two bays B-1, B-2, shown as part of frame 11' (e.g. FIG. 12).

Preferably, these bays awe identically dimensioned, to receive a multi-purpose disk module or cartridge P (e.g. see P-1, FIGS. 15, 16, detailed below) adapted to house like drives of various manufacturers (here, we prefer that the bays are adapted to receive 3.5", or similar hard disk drives, or else RDAT or similar size tape drives—if 5.25" half-height hard disk drives are to be accommodated, some minor adjustments, such as enlarged port and modified bezel and shock mount, will be necessary—a hard-disk module P may be about 2.1" high×4.8" wide×6.8" deep).

A disk module P (e.g. FIGS. 14–16) is made up of a support housing in which is placed a hard disk unit dd (e.g. dd-1 in P-1, dd-2 in P-2). Each module P is to be inserted into a bay B-1 or B-2. Atop B-2 is floppy disk-/lock unit 11-F with a latch-plate 11-LP (FIG. 12A) coupled between the bays and 11-F. The frame 11' is thus adapted to receive a pair of hard disk drives, dd-1, dd-2, which, according to a feature hereof are made easily removable/replaceable. Each bay B-1, B-2 has a door d-1d, d-2d provided to close the front thereof, or be slid back into its bay (along tracks at top of bay) when a drive module is present.

FIG. 11 shows frame 11', assembled (atop base B), with cover cc' for the entire assembly of computer CB' shown in FIGS. 8, 10. Cover cc' is similar to that for the aforedescribed computer CB, comprising a pair of sidewalls joined by a top wall (e.g. and see FIG. 10, where add-on side-panels PC-R, PC-L are shown exploded-away).

FIGS. 12, 12A are enlarged, more detailed and somewhat exploded views of these disk bay elements (frame 11', etc. ), these broadly, including a floppy drive/lock unit 11-F, a lock-plate 11-LP and a pair of door-panels d-1d, d-2d each to cover a hard drive-bay—all to be mounted on frame 11' as indicated. Doors D-1d, D-2d swing free (on pins d-p, d-p) and are adapted to be tucked-back along the "roof" of their bay (—as in embodiment 11, cf. pins d-p slide back along receiving tracks). Thus, lock unit 11-F' will be understood as adapted for housing a suitable floppy drive within its frame which is to be attached to frame 11' (e.g. via tabs atop bay B-2 as known in the art). Similarly snap-in tabs 11-T' will be understood as adapted for connecting frame 11' to the deck 7-P atop plenum 7'. Frames 11', 11-F may comprise sheet metal, while modules P may be metal-coated plastic.

Frame 11' thus provides a pair of like hard disk bays, B-1, B-2, each to receive a removable cartridge-enclosed hard disk drive in a disk module P (FIGS. 15, 16-A, 16-C) or to be covered by a respective swing-up front cover or door. Since each module P is conductive (metal-coated) and will have a height slightly less than that of either disk bay, the aft end of each bay is preferably provided with spring means, such as flexure strips fs, fs', to urge a module downward, so as to "ground" it and so its channel (e.g. D-63, FIG. 16-B) will engage a respective floor-pin (a central location for fs is suitable, as in bay B2, FIG. 12-A for fs', two springs fs are used in bay B1, since the floor pin pp-2 in bay B2 prevents using just one).

Figure 14:
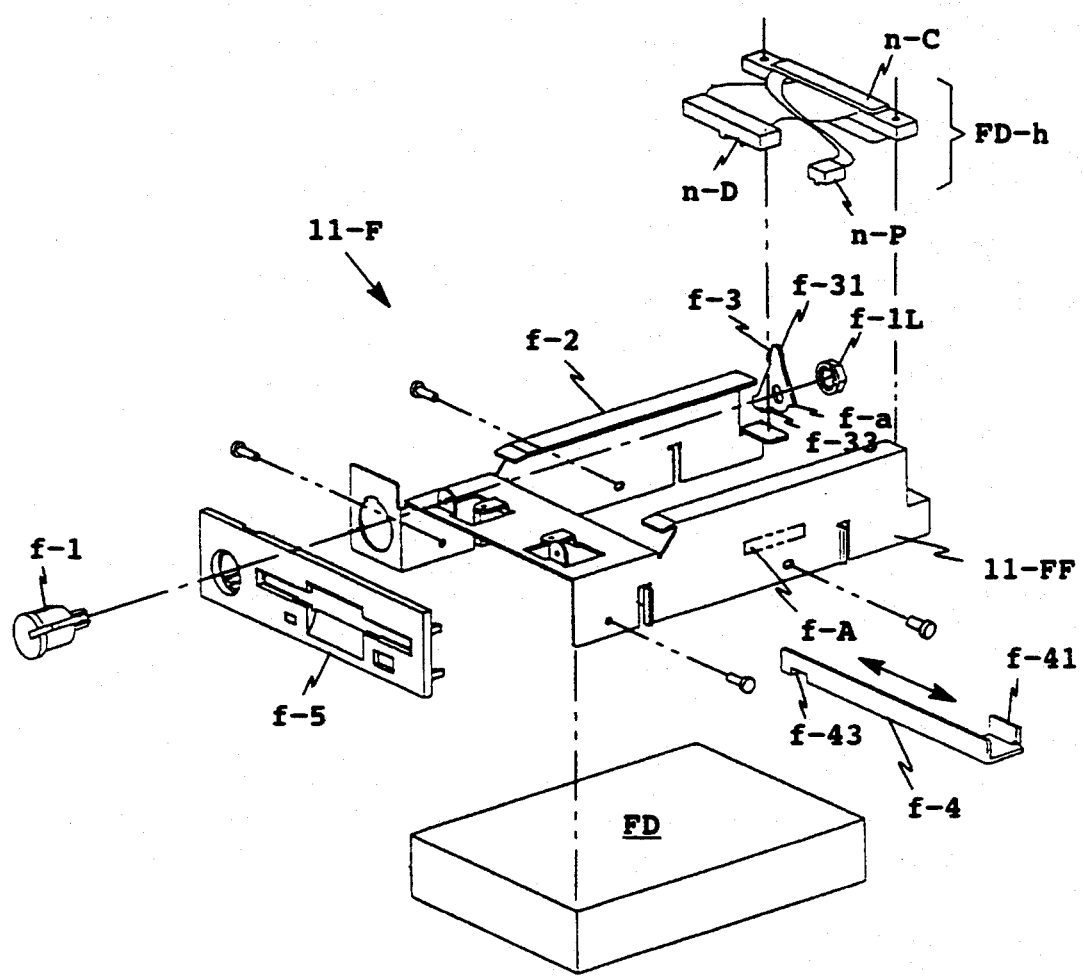
Figure 15:
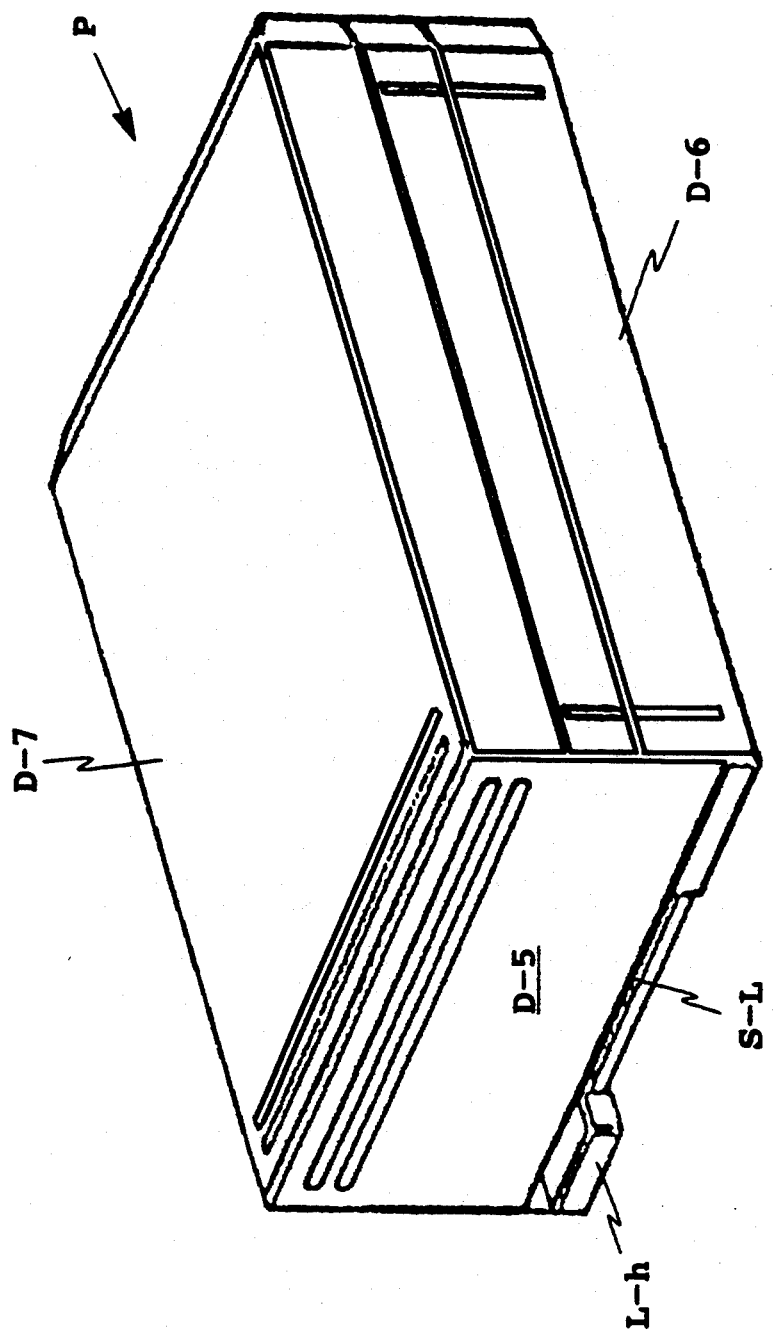

Floppy/Lock Assembly, FIG. 14

Figure 13:
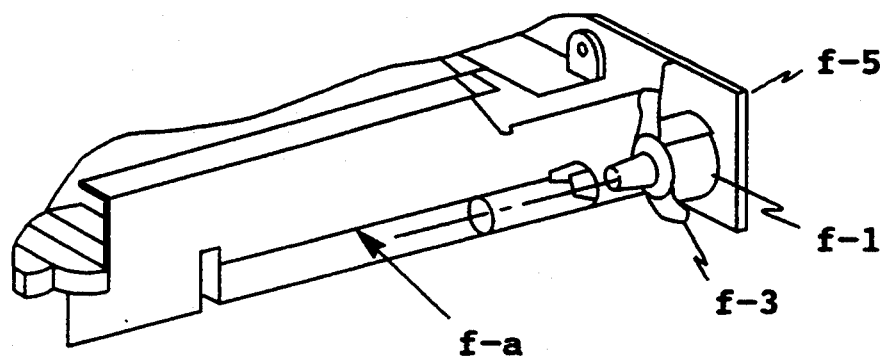

FIG. 14 explodes-apart salient elements of floppy/-lock unit 11-F from its frame 11-FF: namely floppy drive FD and connector-harness Fd-h (to be secured on 11-FF), face-plate f-5 (bezel, tab-connected to 11-FF), key-lock plug f-1 to be seated therein, lock-bar f-4 in 11-FF and lock-cam f-3, secured on f-1 to be rotated thereby (as in FIG. 13).

With bezel f-5 tab-connected to the front of frame 11-FF, locking-plug f-1 is seated (by nut f-1L) into f-5 and extends through the receiving aperture in frame 11-FF, being coupled to rotate a two-tooth cam f-3 secured thereon. Cam f-3 will be rotated conjunctively with rotation of plug f-1 (preferably via a user-operated key-lock fitted within f-1, as workers will understand). Cam f-3 has a pair of lobes or teeth: one, f-33, for engagement in cam-aperture f-30 in plate 11-LP for reciprocation thereof (see arrow FIG. 12A); the other tooth, f-31, for engagement in cam-aperture f-43 of lock-bar f-4 for reciprocation of f-4 (see arrows). A pair of flats f-a, f-a' can engage a stop (on f-1, not shown) to limit the rotation of f-1 as known in the art. Thus, rotation of plug f-1 will lift/drop plate 11-LP and also slide lock-bar f-4 back and forth. Bar f-4 is slidingly engaged in receiving slots in frame 11-FF and includes a lock-slot f-41 at its distal end. Slot f-41 is adapted to lockingly-engage a receiving catch on the underside of cover CC' to hold CC' when bar f-4 is driven out of frame 11-FF.

Plate 11-LP is removably attachable to frame 11' by threading of its two cruciform cut-outs f-0, f-0' over receiving flaps fL, fL' (FIG. 12A) on which it is adapted to be reciprocated, up and down (see arrow) between side-guides sg, by key-rotation of plug f-1, and cam f-3 (tooth f-31, thereof engages hole f-30) as known in the art. Such insertion will act to present switch-foot f—f, at the bottom of 11-LP, in position to open and close an associated Power-Enable switch SW-SD (not shown, but known to artisans), adapted to cut-off power (preferably to entire computer CB'; alternatively just to disks). Thus, when key-plug f-1 lifts 11-LP to the "UP", or "POWER-ON" position, foot f—f releases switch SW-SD from OFF to ON. In this "UP" position also, a pair of door-lock tabs t-1, t-2 are lifted into position (along slots T-SL along a side of module-shells D-6, FIG. 16-B) to lock-shut respective bay doors D-1d, D-2d—if the respective door is closed over its respective bay—or to bar the full-lift of 11-LP if either hard drive module is not fully inserted (since, then, tabs will not register with T-SL).

Also, stops S-1, S-2 are raised, in this "UP-position", sufficient to engage respective Levers L1, L2 (catch-holes L-1c, L-2c thereof) and hold them at "Full Throw" position (e.g. as in FIG. 20) and so retain the levers and their modules P in locked condition, thus retaining the respective drives locked into their respective bays. Levers L must be fully-thrown, leftward, to properly seat their drive module P and connect it electrically to connect-card 11-TC; then, the ends of latches L will be understood to protrude through the wall of their bay to register their catch-hole L-c with a respective stop S-1 or S-2 (i.e. protrude through a T-shaped hole h-1, h-2—see FIG. 12A).

Conversely, when plate 11-LP is dropped (by rotating key-plug f-1 etc. counter clockwise, so lobe f-33 cams 11-LP downward, FIG. 14), into its "DOWN", or POWER-OFF position, foot f—f is dropped to shut-off power-switch SW-SD and cut-off power to computer CB'. And, in this "DOWN" position, the illustrated clearance above each stop-tab S-1, S-2 is arranged to allow passage of (release-throw of) respective levers L-1, L-2 (catch-holes L-C thereon can "pass") so that, then, either of the respective disk drive modules P may be pried-out and withdrawn from, their respective bay (as detailed below).

Thus, plate 11-LP and its associated lock-means exhibit three functions contemporaneously; they are adapted to switch system power ON/OFF, to coordinately lock either/both hard-disk bays if "empty" (behind doors D-1d, D-2d) or to lock-in levers L and their modules in a bay—if inserted FULL-IN (to thus prevent insertion or withdrawal of either module P while power is ON—i.e. either blocking opening of a door or blocking release of levers to unseat a module). The lock means f-1, f-3 also provides a fourth function—namely lockin-on cover CC' superposed over frame 11' and the entire machine CB'.

That is, the (clockwise) rotation of plug f-1 and cam f-3 (see arrow FIG. 14) acts to lift plate 11-LP to its "UP"/POWER-ON position and also acts to throw bar f-4 to the right (via lobe f-31 engaged in slot f-43), thrusting its slotted end f-41 to engage a receiving catch (not shown, but known in the art) on the underside of cover CC', removably placed over the entire computer assembly CB'. Bar f-4 will thus be understood as slidingly received in suitable guide-slots in frame 11-FF, (FIG. 14).

Of course, such a key-lock array can be replaced with other means for locking hard-disk cartridges P into their bay, (and for the other functions) or in some cases, dispensed with altogether. But workers will recognize the value of such a security system whereby such cartridges (disk drives) can be locked-in to prevent unauthorized access (e.g. to secure data stored on the disks) while also coordinately blocking the bays, engaging CC' and switching Power ON/OFF.

Of course, workers will often strongly prefer the security of having drives which are thus packaged in a removable receptacle P, e.g. so they may be removed and stored in a safe secure place when not being used—while also being available for use on other machines.

Hard Disk Bays

Preferably, the two disk bays (behind doors D-1d, D-2d) are very similar and are adapted to receive, and operate, any like hard disk drive module P. Modules P house virtually any relatively "standard" mechanical and electrical hard disk drive design (e.g. here, any 3.5" hard disk drive or "R-DAT" type drive). According to a feature hereof, each such module P (see FIGS. 16, 17, 18) encloses its drive as a receptacle adapted to protect it mechanically (e.g. with resilient support to attenuate shock and vibration, as noted below) while adapting it electrically (e.g. via a harness hs—see FIG. 18—to couple it to computer CB' via connector card 11-TC, as known in the art) and isolate it electrically. One such receptacle P-1 (for a standard disk drive dd) is indicated in FIGS. 15-18, with dish-shaped top and bottom covers D-7, D-6 and with a front bezel D-5, (shown exploded-away) and with an anti-shock platform or shelf D-4 which is attached to, and supports drive dd within bottom cover D-6. Platform D-4 includes a plate D-41 supported between a pair of cushion-pads D-42, D-42'. Plate D-41 is configured for a wide variety of screw-hole patterns to provide a "universal mounting plate" for any number of drive-types. Harness hs includes a connector CL-1 and platform D-41 is, itself, shown in FIGS. 16C, 17, with like support pads D-42, D-42' shown exploded-away. Pads 42, 42' are attached (e.g. bonded) on opposite sides of plate D-41, and adapted to rest on the floor 6-F of shell D-6 when the unit D-4 is dropped therein (guides g,g fixing pad-position, front-to-back, and top-flanges D-71, D-71' superposed to constrain the pads vertically when cover D-7 is affixed on D-6.

Where frames 11', 11-FF are preferably of metal (e.g. formed of sheet-metal), as are levers L; the rest of the disk array is preferably of plastic. Modules P are preferably of cast ABS or the like (top, bottom, bezel: D-7, D-6, D-5), and have metal-coated exteriors, while pads D-42 are of Sorbothane or like resilient elastomeric foam. All exterior surfaces of covers D-7, D-6 are preferably metal-coated so as to accommodate grounding to metal frame 11'. For instance, note springs fs, fs' on the top rear of each bay; these are adapted to urge a module P down to contact the bay-floor D-16, D-26 and ground their metal periphery to the frame (e.g. dissipate charge from user's fingers as he grips metallic module lever L in inserting module B).

Preferably, platform D-41 is metal and also includes a clearance-aperture D-40 adapted (as described below) to clear the snap-in pivot-boss L-pl on a respective lever L-1, whereby the lever is Journaled for rotation (i.e. to prevent D-41 from engaging any part of Lever L). Lever L (FIGS. 16-20) is arranged to engage/disengage a cam-slot thereof L-N, with a pin pp fixed on frame 11' (bay floors D-16, D-26 thereof) and thereby drive its associated receptacle P into and out of a bay (see arrow-pair, FIG. 19A) along the bay floor—in which pin pp is mounted; (e.g. see pin pp-1, FIG. 19-A, on floor D-16 of bay #1 for receptacle P-1). Each module i(receptacle) P preferably comprises a removably interfitting top and bottom with its drive-mounting shelf resiliently suspended across the bottom (e.g. FIG. 16B, 16C, top D-7, bottom D-6 and shelf D-4, with removable bezel or face-plate D-5). Bottom shell D-6 of receptacle P-1 (FIG. 16B) may be understood as comprising a (rigid, plastic) floor 6-F, surrounded by three sides, and removable bezel D-5. In floor 6-F is mounted a hub (axle) D-61 arranged to mount lever L via hole L-a (FIG. 19B) and surrounding boss L-pL. Hub D-61 is placed to avoid interference with shelf D-41 (when D-4 is later inserted in D-6; lever L being installed along floor 6-F, through slit S-L along front of shell D-6, and so being attached to be part of its module P.

Lever L thus has an aperture (e.g. L-a, FIG. 19B) in which a washer, or journal-ring L-pl (e.g. of Delrin) may be formed, being arranged (dimensional to fit onto axle D-61 projected up from the floor of each shell-bottom D-6 (e.g. see D-61, FIGS. 16B, 19A) and adapted to journal lever L for rotation in module P. Preferably, hole L-a is adapted to be tightly fastened to plastic ring L-pL (e.g. L-pL cast-into L-a and set in situ, with top-/bottom portions overlapping L-a rivet-like, to retain boss L-pL on L and resist axial forces, and with the periphery of hole L-a cut-out as in FIG. 19-B to grip boss L-pL vs. circumferential forces). Similarly, a handle extension L-h is formed on the proximal end of each lever L (FIG. 20) and is preferably covered with a suitable plastic (e.g. molded-on and held by fill-hole f-h as known in the art).

After attachment of lever L-1 to module P-1 (FIG. 16B), shelf D-4 is attached to its drive and elastomer pads D-42. Then the shelf-drive unit is removably mounted on floor 6-F, with pads D-42, D-42' slid down between side-guides g,g' and sides D-61, D-61' to mount the drive resiliently on D-6 in mechanical isolation, as known in the art. Resilient pads D-42, D-42' are adapted for receiving and retaining platform D-41 (e.g. bonded thereto) in receptacle P-1 as known in the art. These (or like) resilient elastomeric pads will be appreciated as the only means coupling the platform D-41 (and the drive attached thereon—not shown) to floor 6-F and the rest of the receptacle structure, thus isolating its drive from external shock, vibration, etc.

Figure 20:
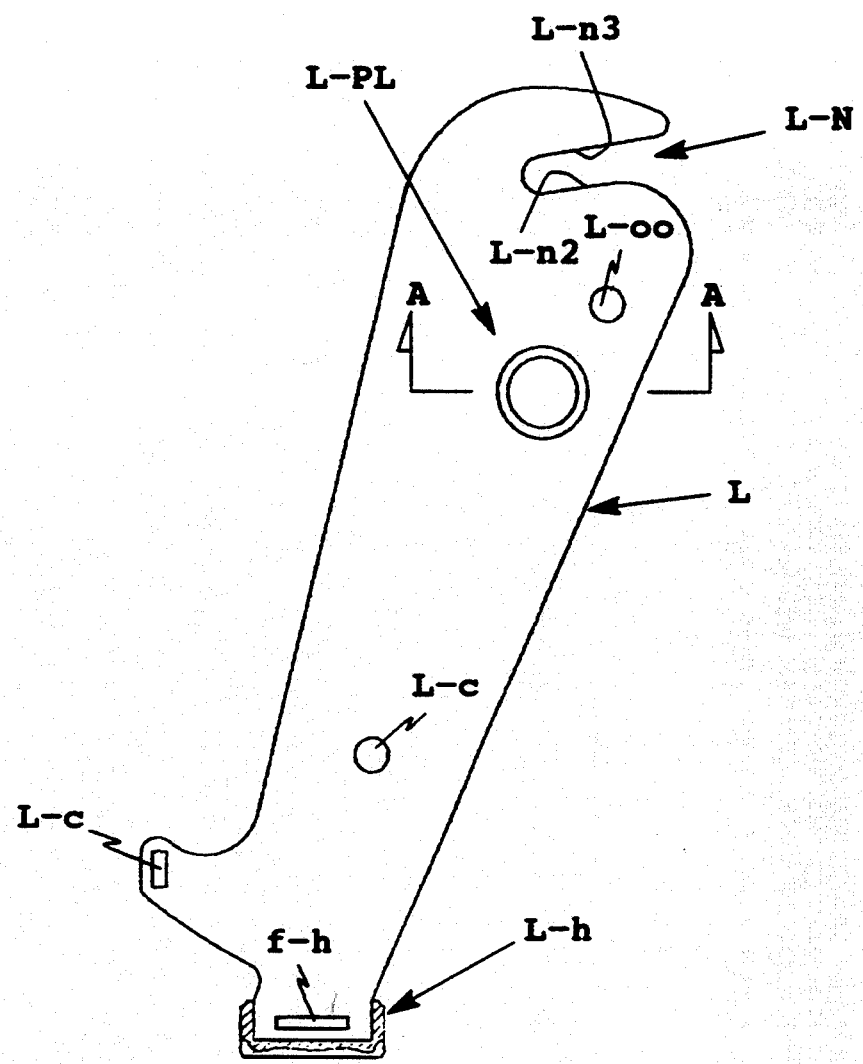

Each lever L also includes a catch-hole L-C to one side of its near end (see FIG. 20—for engaging a tab S-1 or S-2 on plate 11-LP when 11-LP is raised. Lever L also has a cam-slot L-N at its other end, with intermediate aperture L-a and surrounding pivot-washer L-pL as mentioned. Slot L-N will be understood as shaped and dimensioned so as to readily engage a cam pin pp mounted in a bay-floor when its receptacle P is to be cam-urged in against the multi-pin connector at the rear of a bay. Thus, slot L-N is divergent at its entry-segment, and is chamfered to smoothly terminate at a position which will thrust its module/connector Full-in. (Lever L pulls on pin pp at distal slot-edge L-n1, to pull-in its module P and insert connector CL-1 into a mate on card 11-TC.) Counter-rotation of lever L will act to push-out (cam-out) its receptacle P, reverse-thrusting via slot-edge L-n2 on pin pp to disconnect CL-a and push P-1 out of the bay.

Workers will appreciate how convenient it is to provide a removable memory module like P with combined handle/pry means L that so ably helps insert/extract the module vs. connector-resistance (e.g. up to 30–40 lbs. of manual effort can be involved) and also provides lock-in means (catch L-c). Without the mechanical advantage of such a lever, users would at times, have to hold the entire machine in place while they are tried to push-in or pull-out a module—something quite awkward to do.

Figure 17:
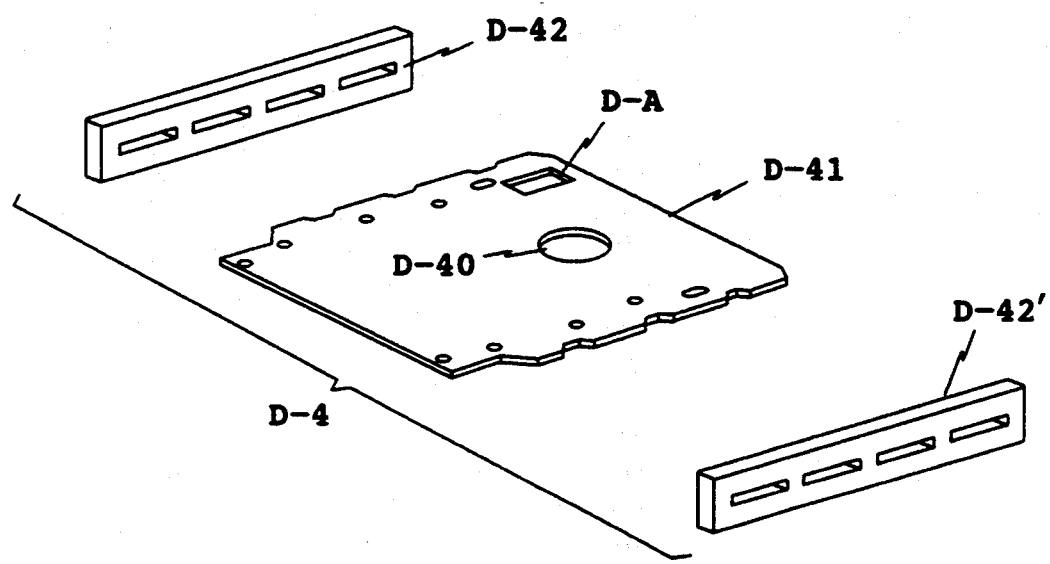

Elastomer pads; FIGS. 16, 17

Pads D-42, D-42' are intended to attenuate shock and vibration of package P (and the drive dd carried thereon), decoupling it, mechanically and electrically, from the drive mounted on shelf D-41. They also function as the means by which support D-4 and its drive, are removably fitted-into receptacle P.

Preferably, these identical elastomeric blocks D-42, D-42' comprise a pair of like relatively rectangular shock-mount pads, (e.g. see FIGS. 16, 17) which are fixedly attached on each side of mounting plate D-41, preferably with a suitable adhesive (the adhesive assures that the pad will work in tension as well as compression; this also increases its effective area making it stiffer vs. vibration yet able to absorb greater shock forces). A preferred pad material is "Sorbothane" (T.M. of Sorbothane Inc. of Kent, Ohio) a visco-elastic "soft foam rubber" elastomer (prefer Shore hardness "00"–50; next preferable is Shore hardness "40"). This elastomer is highly-deformable and quasi-liquid, with good absorption of shock and vibration energy, over a broad temperature range (on deformation it recovers its original shape, but slowly, to thereby dissipate energy).

Assembly of Modules P (FIGS. 16–19)

Referring to FIGS. 16–19, each disk drive modular receptacle P may preferably be assembled as follows (using P-1 as example). First, Lock-Lever L-1 is threaded into slit S-L of bottom-shell D-6 and placed on its floor 6-F with pivot ring L-pL being press-fit onto pivot-axle D-61, upstanding on floor 6-F, for rotation thereon.

Then, front panel (bezel) D-5 is attached on bottom shell D-6 (slide-down as illustrated; note: one can devise a different bezel to identify different drives, e.g. with LED indicators). Panel D-5 will rest on front wall 6-w, which includes clearance slot S-L along the center of its bottom edge, sufficient to allow lever L-17 to be inserted and to swing between "Lock-in" position (as in FIG. 19A) and "unlocked" position (in phantom, FIG. 19A). Preferably, all receptacles P are alike except possibly, for the design on bezel D-5.

Bottom shell D-6 is arranged to receive shelf D-4 (pads, with drive affixed on plate D-41 thereof). So unit D-4 may now be inserted, with pads D-42, D-42' slid down between guides g to rest on floor 6-F. (With pivot axle D-61 and boss L-pL placed just below clearance-hole D-40 in plate D-41. Hole D-40 is preferably provided to prevent interference therebetween, unless there is already enough clearance under shelf D-41 to make this unnecessary).

Then, top cover D-7 is affixed onto shell D-6, with flexure hooks D-63 seated in receiving seats D-23 of D-7 as known in the art, and with projections D-71, D-71' thereby pressed firmly onto elastomer pads D-42, D-42' to constrain them in place.

Figure 18:
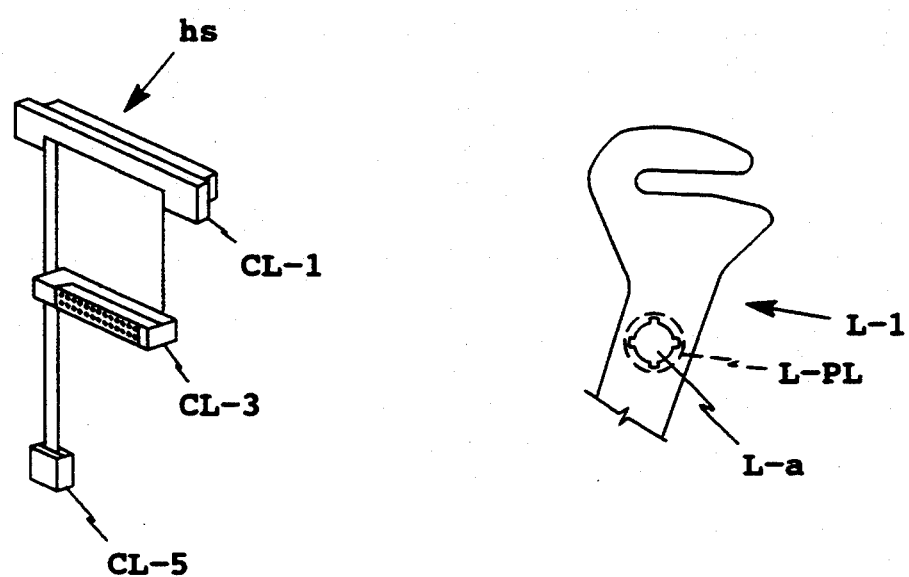

Here it is understood that the disk drive (not shown), on plate D-41 presents a suitable pin-connector and power cable for electrical connection to computer CB', via card 11-TC (e.g. harness hs in FIG. 18, with one end CL-3 (and CL-5 for power) adapted to mate with drive connectors and the other end CL-1 mating with a receiving connector terminal on card 11-TC.

These flex-hook connections (hooks D-63 in seats) are readily unfastened without special tools—e.g. with a mere knife or like common tool inserted to deflect and unseat the hooks (e.g. via slits sp). Despite its convenience, this discourages opening by any save authorized personnel, and accommodates simple assembly.

Now, the so-assembled receptacle P-1, housing its disk drive, is ready to be placed in a "bay" in disk frame 11': e.g. to be placed in bay #1 (B-1), it is slid along floor D-16 thereof, with its pin-channel D-65 (FIG. 16-B) aligned to receive lock-pin pp-1 on bay floor D-16 and so assure proper alignment of P-1 as it slides into bay B-1. Lever L-1 should be swung to center "unlocked" position until its cam-channel L-N-1 can engage lock-pin pp-1—note cable harness hs will already have been fitted onto the rear of bottom shell D-6 (to allow its connector CL-1 to be driven-into the mating connector on card 11-TC; also bay door D-1d will have been swung-up and slid-back to allow insertion of P-1, of course).

Thus, with P-1 so pushed well-into B-1, now lever handle L-h-1 may be swung leftward (from phantom-position to full-line position in FIG. 19-A), so the notch L-n3 at the distal end of L-1 will be cammed against associated pin pp-1 (positioned at the enlarged mouth of L-nl to assure engagement). Thus, as L-1 makes its excursion vs. pp-1, the entire receptacle P-1 will be gradually and firmly pushed rearward (see double-arrows FIG. 19-A) in its bay, to firmly seat connector CL-1 into the associated pin-connector on card 11-TC, and also drive the catch-hole L-c (FIG. 20) through hole h-1 in the side of B-1, aligning L-c to register with tab S-1 when plate 11-LP is lifted.

Similarly, counter-rotation of L-1 will cam notch L-n1 (edge L-n2 thereof) vs. pp-1 in the opposite sense, to gradually disconnect the pin connectors and to push P-1 back toward the front (entry-end) of its bay, along floor D-16. Workers will recognize the mechanical advantage and convenience of such a lever-handle for these purposes.

Summary of Lock-operation (FIGS. 14-20)

The operation of the locking means abovementioned may be summarized as follows (here, assume that the elements of floppy-lock unit are complete and installed in frame 11-FF, with key-plug f-1 and lock-bar f-4 installed in place, and with a hard disk drive installed in one or both disk drive bays, and with lock-plate 11-LP installed, etc.). The object will be to simply lock-in the module(s) P (handles thereof) and block the bay doors, while coordinately locking-in cover CC' and enabling Power;—all, simply by rotating key-plug f-1:

1. The key is inserted and used to rotate plug f-1 so as to rotate cam-lobe f-31 clockwise (FIG. 14) and so lock-on cover CC'; by sliding bar f-4 right-ward, to engage the hook on CC' (also see FIG. 13).

This rotation of plug f-1 also rotates cam-lobe f-33 to lift lock-plate 11-LP (FIG. 12A) sufficient to block either of doors D-1d, D-2d (lift prongs t-1, t-2 sufficient to place them in front of their respective doors, if the door was hung-closed, with no module P in that bay). But if a drive module P is only partly-inserted and is not pulled-in fully (by throwing its lever L full-leftward), it will be protruding and will interfere with up-passage of t-1, t-2, since the slot T-SL along P will not register with t-1 or t-2. This will also prevent the full-lifting of 11-LP. Also, the catch-hole L-c on a lever L (FIG. 20) will not be registered with its stop-tab S; since the free lever-end will not be positioned to pass full-through its T-hole h-1 or h-2 (i.e. its module P must be cammed FULL-IN by its lever L to so position the lever-end; e.g. FIG. 19A indicates the FULL-IN position of cartridge P). Doors D-1d, D-2d may thus be locked-closed to prevent insertion of fingers, tools, etc. which may connect with "live conductors".

This lifting of 11-LP also pulls-up its stop-tabs S-1, S-2 acting to thus secure levers L-1, L-2 (only L-1 shown) in lock-in condition, by engaging respective catch-holes L-C1, L-C2 thereon.

So lifting plate 11-LP also elevates switch detent f—f to activate switch SW-SD and thus turn-ON power to machine CB'. Thus, rotation of key plug f-1 also automatically enables (switches-on) power to computer CB', while lifting latch-plate 11-LP and thrusting lock-bar f-4. And, preferably, a pair of limit-shoulders f-33 are provided on cam f-3 to engage a stop f-s (not shown) to limit the rotation of plug f-1 (and limit resultant travel of 11-LP and f-4).

We will next describe how this module P-1, so inserted FULL-IN into Bay B-1, may be locked-in via plate 11-P, and plug f-1 etc. and machine CB' turned "ON".

We will assume that machine-cover CC' is in place and that companion bay B-2 is either "empty" (and its door d-2d dropped across its entry-end) or is "full" with a like module P-2 inserted there FULL-IN as for P-1.

Simply put, plug f-1 (FIG. 14) is rotated clockwise (e.g. using its key) to lift plate 11-LP (via cam lobe f-33—this also lifting foot f—f to activate Power-enable) and to drive lock-bar f-4 rightward to lock-on cover CC' (via cam lobe f-31). Of course, so lifting 11-LP also locks tabs S-1, S-2 into the catch holes L-C of any lever(s) presented FULL-IN, to hold the levers there, and it raises block-tabs T-1, T-2 in front of a respective bay-door (if closed, with bay "empty") to block opening thereof (so raising T-1, T-2 is possible only if no module P-1 or P-2 is present or is inserted FULL-IN, since, as noted, only full-insertion of a module will present its tab-slot to register with T-1 or T-2 and allow it to pass—partial-insertion will thus block T-1 or T-2 and interfere with lifting of plate 11-LP).

Un-Lock Action: FIGS. 12, 13

Assume that lock plug f1 is to be rotated clockwise to lock and counter clockwise to unlock, unlocking proceeds as follows:

the key in plug f-1 is used to rotate it counter clockwise; this results in the following:

1. Cover CC'—unlocked: tooth f-31 on cam f-3, being engaged in slot f-43 on bar f-4 (tooth f-31 projects into f-43 from below), pulls bar f-4 left-ward, carrying stop-f-41 out of stop-relation in front of catch cc-s, hanging down from inside the top of cover cc'—cover cc' may now be grasped and slid-forward to disengage and remove it.

2. Plate 11-LP dropped: the other tooth f-33 on cam f-3, engaged in slot f-30 of plate 11-LP, is simultaneously rotated to drive 11-LP down to UN-LOCKED (POWER-OFF) position, with detent f—f thereby dropping to actuate the associated power switch SW-SD to OFF condition.

2A. Doors released: this drop of plate 11-LP carries block-tabs t-1, t-2 down; below their respective doors D-1d, D-2d (if closed), thus allowing the doors to be swung open (tabs t-1, t-2 protrude through respective slots h-1, h-2 in the sidewalls of bays B-1, B-2, and slide along receiving slots on the aide of a module P present in their respective bay).

2B. Levers released: so dropping plate 11-LP also carries tangs S-1, S-2 down out of locking engagement with respective levers L-1, L-2, if present, (catch-holes L-c1, L-c2 thereof); thus releasing the levers so they can be swung into their bay and cam-disconnect their receptacles P-1, P-2.

To LOCK, the foregoing is reversed; e.g. with receptacles P full-inserted and their levers L thrown to extreme-Left, placing catch-holes L-c1, L-c2 in registry just above their respective tangs S-1, S-2 (each drive-receptacle must be pulled FULL-IN, or else there must be no receptacle in bay). Bay doors D-1d, D-2d may be dropped in place in front of their empty bay. The key is used to clockwise rotate plug f-1, and its cam f-3, lifting plate 11-LP (to bar doors, and to engage and retain lever-catches, also raising foot f—f to enable Power), also throwing bar f-4 rightward to lock-on cover cc'. (Stop f-41 engaged with cover-catch.)

A part-locking (not FULL-IN) throw of a lever L will not throw its catch-hole L-c far enough to register with its tang S, nor pull its module P far enough into its bay to pass tab T—so these will prevent the lifting of 11-LP.

Exemplary Electronics

Figure 7:
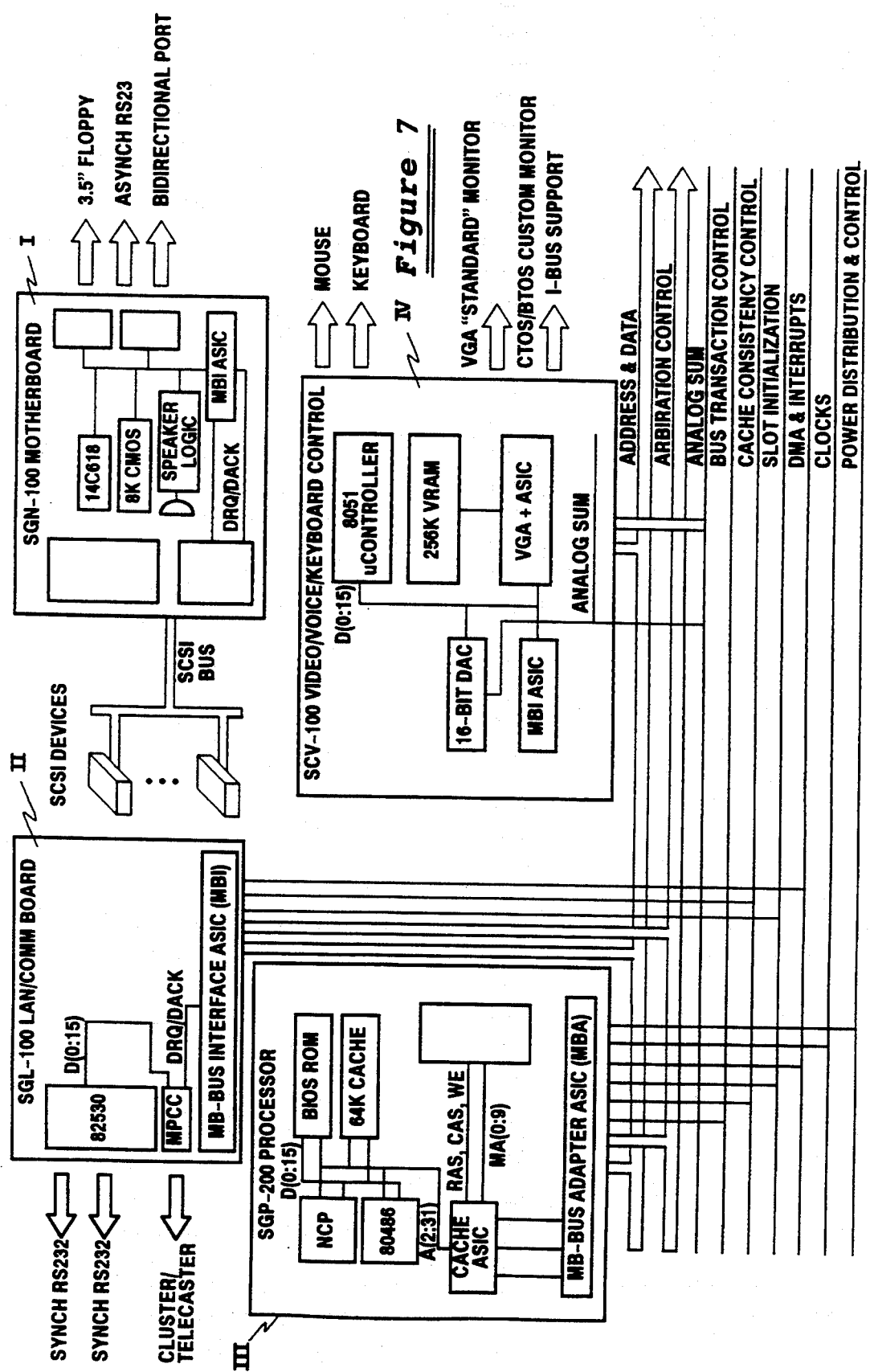
FIG. 7 is a schematic Block Diagram showing how such an embodiment can be interconnected, in itself, and with related devices.

For instance, FIG. 7 shows a functional diagram, simplified and schematic, for an exemplary, preferred motherboard/daughterboard combination. Here, Motherboard I' will be seen as controlling SCSI devices and related peripherals, while three daughter-board units (II LAN/COMM, III Processor and IV Video/Voice/-

Keyboard control), are coupled to associated portions of a common MBBUS/S-BUS array.

Conclusion

It will be understood that the preferred embodiments described herein are only exemplary, and that the invention is capable of many modifications and variations in construction, arrangement and use without departing form the spirit of what is claimed.

Further modifications of the invention are also possible. For example, the means and methods disclosed herein are also somewhat applicable to other related machine assemblies. Also, the present invention is applicable with like modules, along or together, for other like systems.

The above examples of possible variations of the present invention are merely illustrative. Accordingly, the present invention is to be considered as including all possible modifications and variations coming within the scope of the invention as defined by the appended claims.

What is claimed is:

1. An array of memory modules, each being adapted to be removably inserted directly into a receiving compartment, which includes lock means, electrical connector means and engagement-pin means centered therein, each module comprising interconnectable upper shell and lower shell means, being adapted to enclose memory means and including associated electrical connection means adapted to removably mate with said connector means; each module also including single rotatable lever means thereon adapted to engage said engagement means with cam-slot means thereon and to be activated to draw the module into said compartment, with said connection means then mated with said connector means, or to be reverse-activated to disengage said connector and connection means and to help eject the module from the compartment; each said lever means also including outer handle means adapted to engage said lock means only when said module is drawn fully-into a said compartment.

2. The invention of claim i wherein said engagement means comprises an anchor pin disposed medially in said compartment.

3. The invention of claim 2 wherein said lever means includes handle means presented at the front of said module and adapted to be actuated to help pry-in the module into its compartment, once the lever means has engaged said pin.

4. The invention of claim 3 wherein said lever means includes a proximal front portion, with lockable means at its proximal, front portion for engagement with activateable lock means for locking the lever means in place in said compartment.

5. The invention of claim 3 wherein said lever means is journaled on a hub in said module for rotation once said pin is engaged whereby to so help pry-in its module.

6. The invention of claim 5 wherein said lever means includes cam-slot means for so engaging said pin.

7. The invention of claim 6 wherein said module includes a floor portion and said hub is disposed on said floor portion of said module and said lever means is engaged thereon before the memory means is placed therein.

8. The invention of claim 7 wherein said lever means includes a proximal front portion with lockable means at its proximal, front portion for engagement with acti-vateable lock means for locking the lever means in place in said compartment.

9. The invention of claim 8 wherein each said module comprises a lower shell including fastener means and an upper shell including fasten-seat means adapted to be engaged with said fastener means.

10. The invention of claim 9 wherein said fastener means comprise flexible hooks.

11. The invention of claim 10 wherein said memory means is mounted on a plate which, in turn, is supported on flexible elastomeric pads.

12. An array of memory modules, each module being adapted to be removably inserted into a receiving compartment, which includes electrical connector means including a floor portion and engagement means, including pin means, in said compartment floor portion; each module being adapted to enclose memory means and including associated electrical connection means adapted to removably mate with said connector means;
   each module comprising an upper shell means and a lower shell means with associated hub means plus lever means adapted to engage said engagement means and to be activated to draw the module into said compartment, with said connection means then mated with said connector means, or to be reverse-activated to disengage said connector and connection means and to help eject the module from the compartment; said lever means including handle means presented at the front of said module and adapted to be actuated to help pry-in the module into its compartment, once the lever means has engaged said pin means; said lever means including cam-slot means for so engaging said pin means and being journaled on said hub means in said module for rotation once said pin means is engaged whereby to so help pry-in its module; said lever means being engaged on said module before the memory means is placed therein;
   said lever means further including a proximal front portion with lockable means at its proximal front portion for engagement with activateable lock means on said compartment for locking the lever means and its module in place in said compartment;
   each said memory means being mounted on a plate means which, in turn, is supported on flexible elastomeric pad means which are removably aligned between respective pairs of guide means in said module, and wherein each pad means is constrained vertically by superposed shoulder means suspended from said upper shell means.

13. A data processing unit with identical compartments for receiving associated identical data memory modules, these modules housing memory means, said modules being adapted to be removably inserted directly into a receiving compartment which includes lock means, an electrical connector and engagement pin centered therein, each module including an electrical module connector for mating with the compartment connector and further including its own slotted, rotatable lever to engage this pin and so draw the module into the compartment, while mating the connectors, or to be reverse-activated to disengage the connectors and help eject the module from the compartment; each module being adapted to be removably inserted directly into a receiving compartment, each said lever also including outer handle means adapted to engage said lock means only when said module is drawn fully-into a said compartment.

* * * * *